(12) United States Patent
Kolze

(10) Patent No.: US 7,570,576 B2
(45) Date of Patent: Aug. 4, 2009

(54) DETECTION AND MITIGATION OF TEMPORARY (BURSTS) IMPAIRMENTS IN CHANNELS USING SCDMA

(75) Inventor: Thomas J. Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 1272 days.

(21) Appl. No.: 10/237,853

(22) Filed: Sep. 9, 2002

(65) Prior Publication Data

US 2003/0012127 A1    Jan. 16, 2003

Related U.S. Application Data

(63) Continuation-in-part of application No. 10/000,415, filed on Nov. 2, 2001.

(60) Provisional application No. 60/402,776, filed on Aug. 12, 2002, provisional application No. 60/296,884, filed on Jun. 8, 2001.

(51) Int. Cl.
*H04J 11/00* (2006.01)
(52) U.S. Cl. .................. 370/204; 370/211; 370/205; 370/335; 370/320; 375/147; 375/238
(58) Field of Classification Search ................ 370/340, 370/204, 324, 211, 335, 320, 342; 375/147, 375/238
See application file for complete search history.

(56) References Cited

U.S. PATENT DOCUMENTS

| 5,142,551 A | * | 8/1992 | Borth et al. ................ 375/219 |
| 5,202,903 A | * | 4/1993 | Okanoue .................... 375/347 |
| 5,230,003 A | * | 7/1993 | Dent et al. .................. 714/794 |
| 5,537,443 A | * | 7/1996 | Yoshino et al. ............. 375/340 |
| 5,751,725 A | * | 5/1998 | Chen ......................... 714/708 |
| 5,867,539 A | * | 2/1999 | Koslov ...................... 375/346 |

(Continued)

FOREIGN PATENT DOCUMENTS

GB         2343343 A   *  5/2000

OTHER PUBLICATIONS

Marco Lops, Member, IEEE, Giuseppe Ricci, and Antonia Maria Tulino; *Narrow-Band-Interference Suppression in Multiuser CDMA Systems*; Sep. 1998; pp. 1163-1175.

(Continued)

*Primary Examiner*—Ricky Ngo
*Assistant Examiner*—Dewanda Samuel
(74) *Attorney, Agent, or Firm*—McAndrews, Held & Malloy, Ltd

(57) ABSTRACT

Systems and methods are disclosed for detecting and mitigating temporary high-level impairments, in a communications channel, and subsequently, mitigating the deleterious effects of the dynamic impairments. The system includes a transmitter and a receiver. The transmitter is adapted to transmit at least one set of modulated signals. The receiver is adapted to receive the at least one set of modulated signals and mitigate temporary high-level impairment in the at least one set of modulated signals using at least one error vector received during the temporary high-level impairment.

28 Claims, 20 Drawing Sheets

U.S. PATENT DOCUMENTS

| | | | |
|---|---|---|---|
| 5,910,959 A * | 6/1999 | Olafsson et al. | 714/752 |
| 5,917,861 A * | 6/1999 | Belveze et al. | 375/340 |
| 5,968,198 A * | 10/1999 | Hassan et al. | 714/752 |
| 6,298,092 B1 * | 10/2001 | Heath et al. | 375/267 |
| 6,581,182 B1 * | 6/2003 | Lee | 714/795 |
| 6,996,196 B2 * | 2/2006 | Kubo et al. | 375/341 |
| 7,266,168 B2 * | 9/2007 | Kwak et al. | 375/347 |
| 2002/0097703 A1 * | 7/2002 | Nieczyporowicz et al. | 370/342 |

OTHER PUBLICATIONS

Jeffrey A. Young, Member, IEEE, and James S. Lehnert, Senior Member, IEEE; Analysis of DFT-Based Frequency Excision Algorithms for Direct-Sequence Spread-Spectrum Communications; Aug. 1998; pp. 1076-1087.

* cited by examiner

DETECTION AND MITIGATION OF TEMPORARY (BURSTS) IMPAIRMENTS IN CHANNELS USING SCDMA

CROSS-REFERENCE TO RELATED APPLICATIONS

This application is related to, and claims benefit of and priority from, Provisional Application No. 60/402,776 dated Aug. 12, 2002, titled "DETECTION AND MITIGATION OF TEMPORARY (BURSTS) IMPAIRMENTS IN CHANNELS USING SCDMA", the complete subject matter of which is incorporated herein by reference in its entirety.

This application is also a continuation-in-part of, and claims the benefit of and priority from application Ser. No. 10/000,415 filed Nov. 02, 2001, titled "Detection and Mitigation of Temporary Impairments in a Communications Channel", which is related to, and claims the benefit of and priority from, Provisional Application No. 60/296,884 filed Jun. 8, 2001, titled "Detection and Mitigation of Temporary Impairments in a Communications Channel", the complete subject matter of each of which is incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The present invention relates to communications channels, all of which are inherently limited in their capacity (or rate) of information transfer by channel impairments. More specifically, the present invention relates to the detection and mitigation of temporary impairments (temporary high-level impairments for example) in information transfer between a plurality of Cable Modems (alternatively referred to as "CM") and a Cable Termination System (alternatively referred to as "CMTS" or "headend").

Communication systems are subjected to impairments, generally of a brief or transitory duration. One example of such impairment is often referred to by the generic term "noise." Noise sometimes emanates for example, from within electrical components themselves, such as amplifiers and even passive resistors. Another example of impairment is referred to as "interference," which is usually taken to be some unwanted manmade emission, from another communications system such as a radio or from switching circuits in a home or automobile for example. "Distortion" is a yet another example of such impairment, and includes linear distortion in the channel, such as pass-band ripple or non-flat group delay for example, and nonlinear distortion, such as compression in an overdriven amplifier for example. It is contemplated that there are many other types of impairments that may also adversely affect communications in a channel.

Often, such impairments may by dynamic in nature. In many cases, the impairment may be at one level of severity most of the time. In this instance, the communications system may be designed or optimized in some fashion to operate at that specific level of impairment. Occasionally, however, one or more of impairments may become so severe as to preclude the operation of such communications system optimized for the more ordinary level of impairments.

Previously, when a large interference or burst of noise occasionally impinged upon the receiver (a CM for example), such large out-of-the ordinary bursts of received power is simply blanked out. Often, analog processing means are used, almost at, if not right at, the receiver input. This may be done especially to protect CMs or other sensitive receiver front-ends from damage. While this technique may provide some benefit in circumstances where the noise or interference power dwarfs the signal-of-interest power, it does not protect against the many other impairments that have power more on the order of the signal-of-interest power (or even much less). Thus blanking does not, by itself, provide the receiver with a means to improve its overall performance in the presence of the lost information, i.e., the information content concurrent with the large noise burst.

One known technique, a forward error correction technique (alternatively referred to as "FEC") has been applied, even unknowingly, to solve this problem. FEC techniques incorporate soft-decision decoding, such as is common with convolutional error correction codes and the Viterbi decoding algorithm. In such correction techniques, as the error power in the received signal increases, such increase is passed directly into the decision process.

Such encoding and decoding techniques have been in common practice for years, and are widely applied without thought to temporary fidelity changes in the channel. Fortunately, in the event of a change in the channel fidelity, the soft-decision decoding takes into consideration the larger error power in making signal decisions. However, unfortunately, often with a change in channel conditions, there is duration of multiple symbol intervals (in a digital communications system for example) where the degradation persists. During this time some symbols may be so severely erred that they actually appear close to another possible but incorrect symbol. In such event, the soft-decision decoder actually "thinks" it has received a low error power, and may rate the wrong signal with a high confidence. This becomes much more likely as the constellation density (of a QAM constellation for example) is increased for high rate communications, Additional techniques, such as a Time Division Multiple Access technique (alternatively referred to as "TDMA") have been applied to solve this problem. In this technique, one or more carrier frequencies are shared among a plurality of CMs. Known standards, DOCSIS 1.0 and 1.1 for example, each of which are incorporated herein by reference in their entirety, define the physical layer, and additional layers, in which a plurality of CMs transmit data upstream to and receive data downstream from the CMTS or headend. In this technique, each upstream carrier frequency or channel assignment is generally shared by a plurality of CMs, each being granted time slots wherein they may use the channel. These grants are allocated and made known to the CMs via the downstream broadcast transmissions. Some of the grants only enable a single CM to transmit, while other time slot grants are in contention mode. That is some, or all, of the CMs may attempt to use the grant. However, if more than one CM attempts to use a grant in the contention mode, all the CMs will likely be unsuccessful in channel use.

Yet another technique, such as a direct-sequence spread-spectrum modulation technique discussed by J. Young and J. Lehnert, in their paper titled "Analysis of DFT-Based Frequency Excision Algorithms for Direct-Sequence Spread-Spectrum Communications," *IEEE Trans. Comm.*, vol. 46, pp. 1076-1087, August 1998, the complete subject matter of which is incorporated herein by reference in its entirety, has also been applied to this problem. In this technique, frequency excision is used to eliminate narrow-band energy, thus enhancing the capacity of direct-sequence spread-spectrum modulation to reject narrow-band interference. However, this disclosed technique focuses on particular waveforms having energy concentrated about a narrow band.

Yet still another technique, such as a Code-Division Multiple Access technique (alternatively referred to as "CDMA") discussed by M. Lops, G. Ricci and A. Tulino, in their paper titled "Narrow-Band-Interference Suppression in Multi-user CDMA Systems," *IEEE Trans. Comm.*, vol. 46, pp. 1163-1175, September 1998, the complete subject matter of which is incorporated herein by reference in its entirety, has also been applied to this problem. In this technique, a decision is made regarding the bit(s) transmitted by each user over a communication system. This decision is based on the projection of the observables on to the orthogonal complement to the subspace spanned by the other users' signatures and the narrow-band interference. The disclosed technique recognizes that blanking and iterative processing may be performed with an orthogonal basis set decomposition of the frequency domain.

Yet still a further technique, such as a Synchronous Code Division Multiple Access technique (alternatively referred to as "SCDMA") comprises a spreading technique to transmit symbols at the same time on the same frequency. More specifically, this technique may be used, in one embodiment, with a DOCSIS 2.0 physical layer standard (alternatively referred to as the "DOCSIS standard"), which is incorporated herein by reference in its entirety. The DOCSIS standard defines the physical layers in which pluralities of CMs transmit data upstream to and receive data downstream from the CMTS or headend.

It is contemplated that in SCDMA, the spreading codes may be cyclical shifts of one 127 chip spreading code, plus one additional chip. Thus, the spreading codes are nearly cyclical shifts of one another. For such SCDMA technique to work efficiently, all the spreading codes must be synchronized as they arrive at the receiver. Timing misalignments may result in inter code interference (alternatively referred to as "ICI"), which may degrade signal performance. Various impairments, interference, distortion or noise in the channel may also degrade signal performance. In one embodiment, special receiver techniques may be employed to limit or mitigate the degradation caused by such channel performance.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention related to systems and methods for detecting temporary high-level (i.e., severe) impairments, such as noise or interference, for example, in a communications channel, and subsequently, mitigating the deleterious effects of the dynamic impairments. In one embodiment, the system includes a transmitter adapted to transmit a plurality of modulated signals and a receiver. The receiver is adapted to receive the signals and mitigate severe impairments in the signals using a multitude of error vectors derived during such severe impairments.

Detection and mitigation of temporary impairments is disclosed in commonly assigned application Ser. No. 10/000,415 filed Nov. 2, 2001, titled "Detection and Mitigation of Temporary Impairments in a Communications Channel", which is incorporated herein by reference in its entirety (alternatively referred to as the "Detection and Mitigation application"). One embodiment of the present invention uses a system similar to that disclosed in the Detection and Mitigation application that is now applied to SCDMA or other modulations, where many chips are impacted by such severe impairments and the receiver is better off erasing (or weighting with low likelihood) the whole set of symbols.

Chip blanking and processing to mitigate impulse noise is disclosed in commonly assigned application Ser. No. 10/136,059 filed Apr. 30, 2002 titled "Chip Blanking and Processing in SCDMA to Mitigate Impulse and Burst Noise and/or Distortion" (alternatively referred to as the "Blanking and Processing application"). In one embodiment of the present invention, detecting the higher impairment levels during a set of symbols can be used to trigger chip blanking similar to that disclosed in the Blanking and Processing application to attempt impairment mitigation via those techniques as well as using the changed likelihood weightings similar to that disclosed in the Detection and Mitigation application.

In other words, this invention is an application of the Detection and Mitigation application to modulations where pluralities of symbols are concurrently transmitted through the channel. Improved performance may result by properly adapting the detection and mitigation teachings to a plurality of concurrent symbols. However, this invention may further incorporate and interact with the techniques of the Chip Blanking and Processing Application. This invention together with the techniques of the Chip Blanking and Processing Application provide beneficial synergy. As an embodiment, if the Chip Blanking and Processing techniques fail to provide a minimum error power estimate (which is explained in the detailed description) or if too many chips are required to determine blanking, then the erasing (or weighting with low likelihood) of the whole set of symbols may be invoked, as taught by the Detection and Mitigation application.

One embodiment of the present invention relates to systems adapted to detect and mitigate temporary high-level impairments, in a communications channel, and subsequently, mitigate the deleterious effects of the dynamic impairments. The system includes a transmitter and a receiver. The transmitter is adapted to transmit at least one set of modulated signals (SCDMA or other modulated signals). The receiver is adapted to receive the at least one set of modulated signals and mitigate temporary high-level impairment in the at least one set of modulated signals using at least one error vector received during the temporary high-level impairment.

In another embodiment, the receiver may make hard decisions with respect to the set of modulated signals and assign likelihood weightings thereto. The system may erase (or weigh low likelihood) the set of modulated signals if a sum of an error power exceeds a predetermined threshold. Further, the receiver may erase (or weigh low likelihood) the set of modulated signals based upon a function of error powers of all the modulated signals. Further, the receiver may discard at least one error vector having an extreme value.

In another embodiment, the receiver may further comprise, alone or in some combination, a demodulator, a plurality of matched filters, a plurality of slicers, a calculator and a hard decision block. The demodulator may be adapted to demodulate the modulated signals. The plurality of matched filters may be adapted to output a plurality of soft-decision values. The plurality of slicers may be adapted to output a plurality of hard-decision estimates. The calculator may be adapted to output at least one error vector, wherein the calculator uses at least once soft-decision value and at least one initial hard-decision estimate to determine the at least one error vector. The decision block may be adapted to determine a hard-decision value.

In another embodiment, the system receiver may be adapted to make preliminary hard decisions on all the signals. Further the receiver may perform at least one of the following including demodulating, filtering, blanking, making assessments of distortion characteristics, matched filtering to an ideal signaling waveform and remodulating, and making at least one distortion decision and performing any additional blanking and filtering as driven by the distortion decision. In this embodiment, the receiver may make hard decisions with respect to the set of modulated signals and assign likelihood weightings thereto. The system may erase (or weigh low likelihood) the set of modulated signals if a sum of an error power exceeds a predetermined threshold. Further, the receiver may erase (or weigh low likelihood) the set of modulated signals based upon a function of error powers of all the modulated signals. Further, the receiver may discard at least one error vector having an extreme value. In this embodiment, the receiver may further comprise, alone or in some combination, a demodulator, a plurality of matched filters, a plurality of slicers, a calculator and a hard decision block. The demodulator may be adapted to demodulate the modulated signals. The plurality of matched filters may be adapted to output a plurality of soft-decision values. The plurality of slicers may be adapted to output a plurality of hard-decision estimates. The calculator may be adapted to output at least one error vector, wherein the calculator uses at least once soft-decision value and at least one initial hard-decision estimate to determine the at least one error vector. The decision block may be adapted to determine a hard-decision value.

In another embodiment, the system receiver may make at least one subsequent hard decision with respect to the set of modulated signals and repair any blanking damage and filtering using the at least one subsequent hard decision.

Still another embodiment relates to a method of performing impairment mitigation on at least one set of modulated signals in a communications system. This method comprises mitigating a temporary high-level using at least one error vector received during the temporary high level impairment. This method may further comprises making a preliminary hard decisions on all the id signals and performing at least one of the following including demodulating, filtering, blanking, making assessments of distortion characteristics, matched filtering to an ideal signaling waveform and remodulating, and making at least one distortion decision and performing any additional blanking and filtering as driven by the distortion decision.

Such methods may comprise making at least one subsequent hard decision with respect to the set of modulated signals and repairing any blanking damage and filtering using the at least one subsequent hard decision. Other methods may comprise generating at least one error estimate, where generating the at least one error estimate may comprise determining at least one constellation point closest to each of the symbols, determining a distance between the symbols and their nearest constellation point; and squaring the distances.

Still another method relates to a method of impairment mitigation in a communications system. This method comprises making a preliminary decision on all signals in a set of modulated signals and remodulating the signals. Distortion is determined for each of the signals using the remodulated signals.

These and other advantages and novel features of the present invention, as well as details of an illustrated embodiment thereof, will be more fully understood from the following description and drawings.

DETAILED DESCRIPTION OF THE INVENTION

Figure 1:
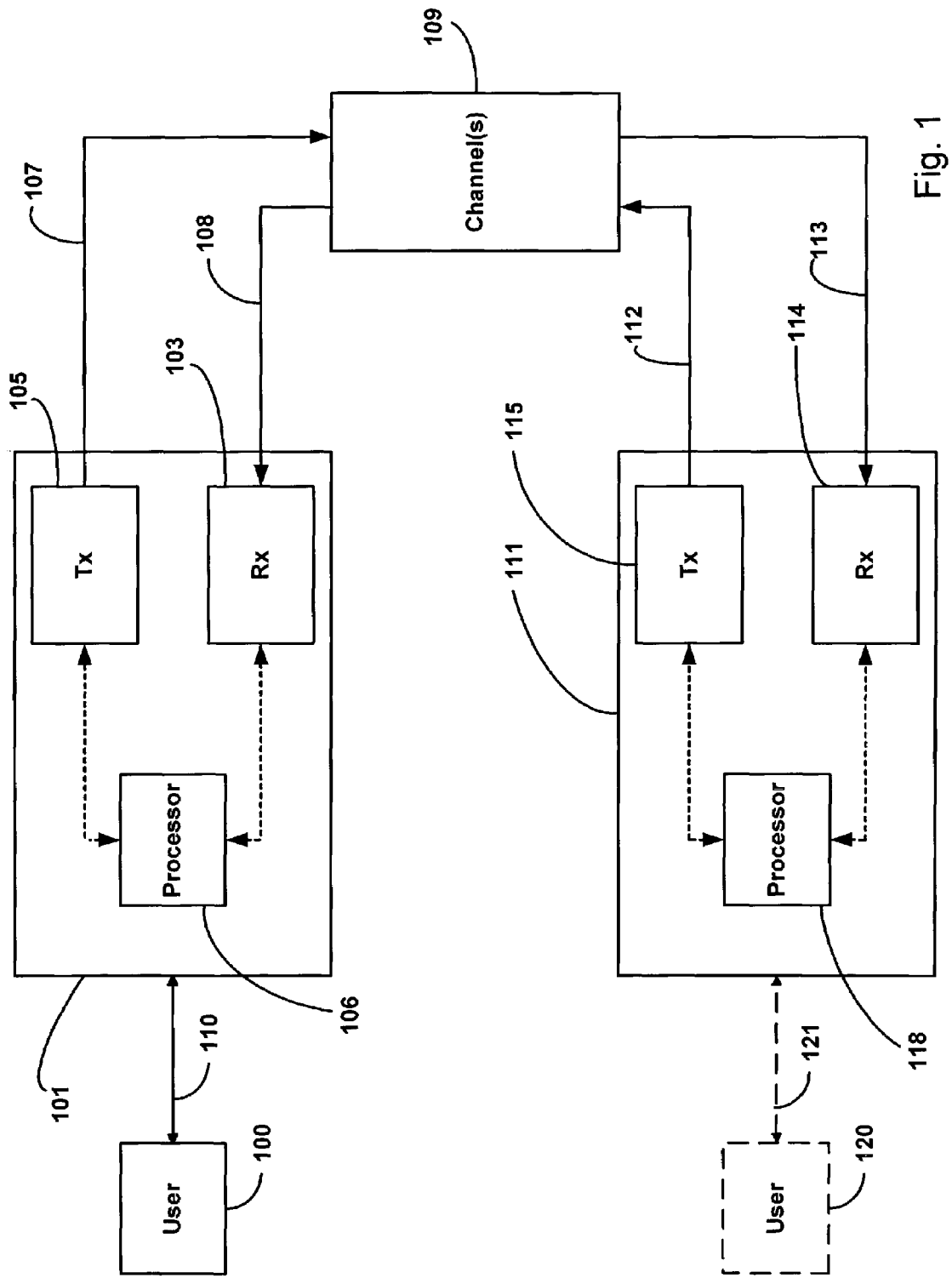
FIG. 1 illustrates a block diagram of a generic communication system that may be employed in connection with the present invention.

The following description is made with reference to the appended figures.

One embodiment of the present invention relates to a spreading technique to transmit a plurality of symbols at the same time on the same frequency. More specifically, one embodiment of the present invention relates to an SCDMA technique for mitigating temporary, high levels of impairments of one up to several chips in communication channels used, in one embodiment, with the DOCSIS standard. It is contemplated that, while an SCDMA spreading or modulating technique is discussed, any spreading or modulating techniques such as OFDM, DMT, and SWMT for example, are contemplated.

According to one embodiment of the present invention, temporary impairments or other distortion-inducing mechanism of duration of one up to several chips (16 chips for example) may be detected. It is contemplated that, while such impairment of 16 chips in duration is discussed; a severe impairment (even of a shorter duration) may be detected and mitigated using the present invention. Means are provided to detect such temporarily high amount of impairment in the symbols and improve the reliability of the symbol decisions even in the presence of such impacted or distorted chips. More specifically, one embodiment of the present invention relates to means for detecting at least one up to several chip(s) with such severe impairment as provided below. In the embodiments provided below, it is contemplated that a chip plays the roll of a symbol, signal, waveform, etc., although other embodiments are also contemplated as discussed.

In one embodiment of the present invention using SCDMA modulation, up to 128 spreading codes are available for modulating each upstream-transmitted symbol. In this embodiment, one or more sets of symbols, where each symbol is comprised of one up to 128 symbols, may be transmitted simultaneously, each symbol using its own spreading code. Each spreading code consists of a sequence of +1 or −1 valued chips, such that there are 128 such chips in each spreading code. In this embodiment, the symbol amplitude and angle are modulated using a vector, applying the vector or its additive inverse (i.e., 180 degree rotation) to the symbol.

In one embodiment, the spreading codes are orthogonal if perfectly time-aligned, and thus the up to 128 symbols in each set of symbols will not interfere with each other, even though they are transmitted at the same time on the same channel. For example, two waveforms are orthogonal to each other if, after multiplying them by each other and integrating, the result of the integration is zero. In SCDMA modulation used with one embodiment of the present invention, at least two but up to and including 128 spreading codes may be used at one time. These spreading codes may be allocated to one CM for example, such that that CM is granted all the spreading codes (128 for example), up to and including the spreading codes being allocated to 64 different CMs for example, such that two spreading codes are granted to each CM. QAM symbols of two bits per symbol and more are spread with the assigned codes, one spreading code per QAM symbol, although other arrangements are contemplated.

In one embodiment using SCDMA, the spreading codes are cyclical shifts of one 127-chip spreading code, except for one additional chip. Thus, in this embodiment, the spreading codes are nearly cyclical shifts of one another. Furthermore, for SCDMA modulation to work efficiently, all the spreading codes should be synchronized as they arrive at the receiver.

FIG. 1 illustrates a block diagram of a generic communication system that may be employed in connection with one embodiment of the present invention. The system comprises a first communication node 101, a second communication node 111, and at least one channel 109 that communicatively couples the nodes 101 and 111. The communication nodes may be, for example, cable modems, DSL modems or any other type of transceiver device that transmits or receives data over one or more channels (generally referred to as CMs).

The first communication node 101 comprises a transmitter 105, a receiver 103 and a processor 106. The processor 106 may comprise, for example, a microprocessor. The first communication node 101 communicates with or is communicatively coupled to a user 100 (e.g., a computer) via communication link 110, and to the channel 109 via communication links 107 and 108. Of course, communication links 107 and 108 may be combined into a single communication link.

Similarly, the second communication node 111 comprises a transmitter 115, a receiver 114 and a processor 118. The processor 118, like processor 106, may comprise, for example, a microprocessor. The second communication node 111 likewise is communicatively coupled to the at least one channel 109 via communication links 112 and 113. Again, like communication links 107 and 108, the communication links 112 and 113 may be combined into a single communication link. The communication node 111 may also be communicatively coupled to a user 120 (again a computer, for example) via communication link 121. In the case when communication node 111 is a headend, for example, user 120 may not be present.

During operation of the illustrated embodiment of FIG. 1, the user 100 may communicate information to the user 120 (or the headend) using the first communication node 101, the at least one channel 109 and the second communication node 111. Specifically, the user 100 communicates the information to the first communication node 101 via communication link 110. The information is transformed in the transmitter 105 to match the restrictions imposed by the at least one channel 109. The transmitter 105 then communicates the information to the at least one channel 109 via communication link 107.

The receiver 114 of the second communication node 111 receives, via communication link 113, the information from the at least one channel 109 and transforms it into a form usable by the user 120. Finally, the information is communicated from the second communication node 111 to the user 120 via the communication link 121.

Communication of information from user 120 to user 100 may also be achieved in a similar manner. In either case, the information transmitted/received may also be processed using the processors 106/118.

Figure 2:
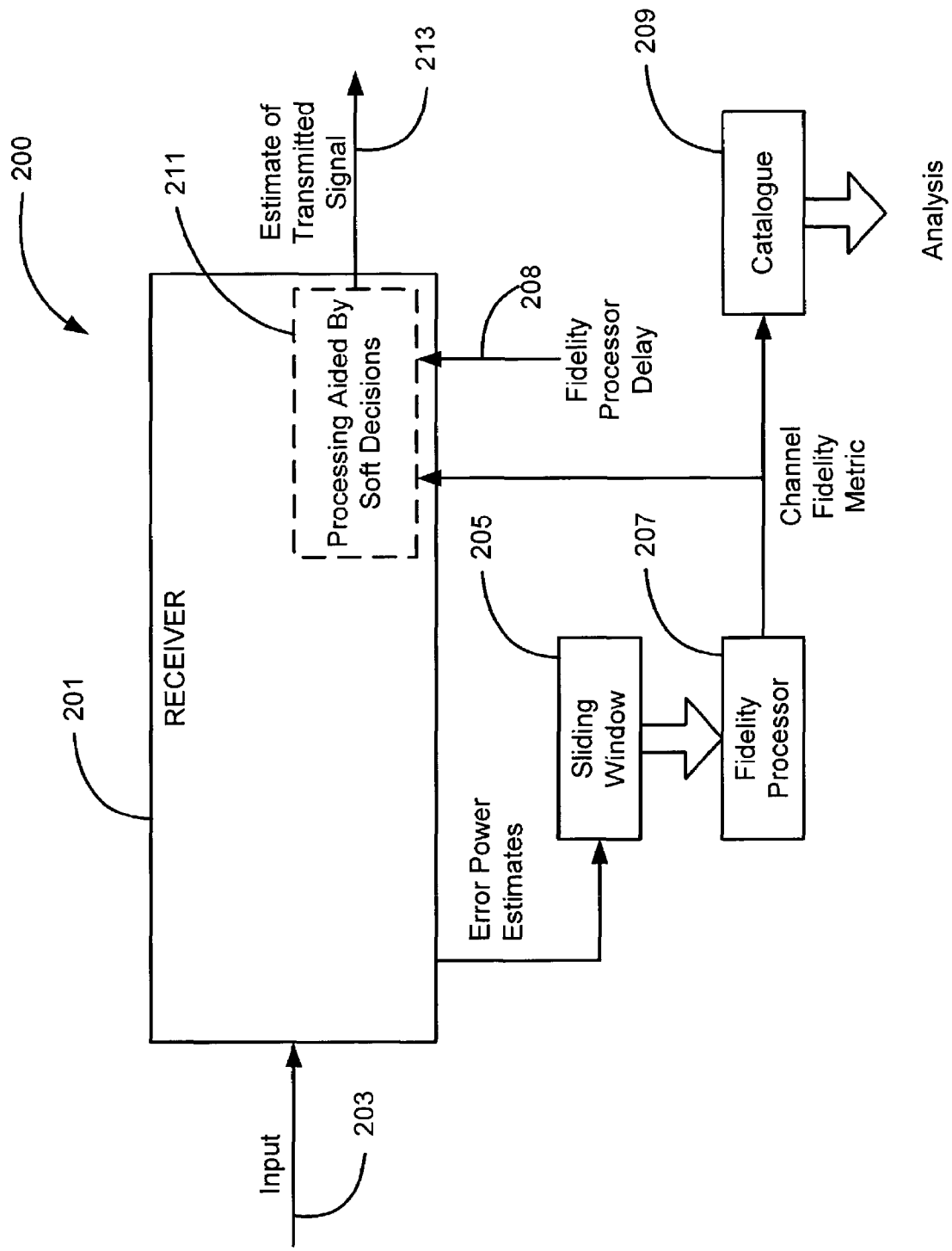
FIG. 2 illustrates a block diagram of one embodiment of an impairment mitigation system in accordance with the present invention.

FIG. 2 illustrates a block diagram of an impairment mitigation system 200 in accordance with one embodiment of the present invention. The system 200 may be contained, for example, in one or both of the communication nodes of FIG. 1. Error power estimates may be generated for analog modulations. A receiver 201 receives an input at input 203 of either noise (when no signal is present) or a signal with time varying distortion and/or noise, for example. The receiver 201 uses the input to generate error power estimates, and may do so using a sequence of bits using a sequence or set of symbols, in a digital communications example. A sliding window 205 receives the error power estimates. The error power estimates are processed in a fidelity processor 207 and a metric for channel fidelity is continuously generated as the window progresses (i.e., over time). The behavior of the metric versus time may be catalogued (see catalogue 209) and/or analyzed and used to optimize the transmission waveform as provided in the Detection and Mitigation application. The behavior of the metric versus time may also be used to enhance receiver performance in real-time, near-real time, or even in a post-reception, post-processing mode.

A delay 208 between the input error power estimates of the window 205 and the corresponding channel fidelity metric is known for a given fidelity processor, and is provided back (made known) to a remainder of the system. The system uses the evolving fidelity metric in its processing, which may be aided by soft-decisions designated 211. Soft-decisions comprise, for example, erasure decoding or standard soft-decision decoding, such as Viterbi decoding. In any case, the receiver outputs an estimate of the transmitted signal (reference numeral 213).

While FIG. 2 illustrates a system having some components and functionality located outside of the receiver, it is contemplated that such system may have additional components or functionality located within the receiver, or may in fact be entirely contained within the receiver. In addition, it is also contemplated that the estimation of the error power and the processing shown as being performed within the receiver of FIG. 2 may instead be performed outside of the receiver.

Figure 3:
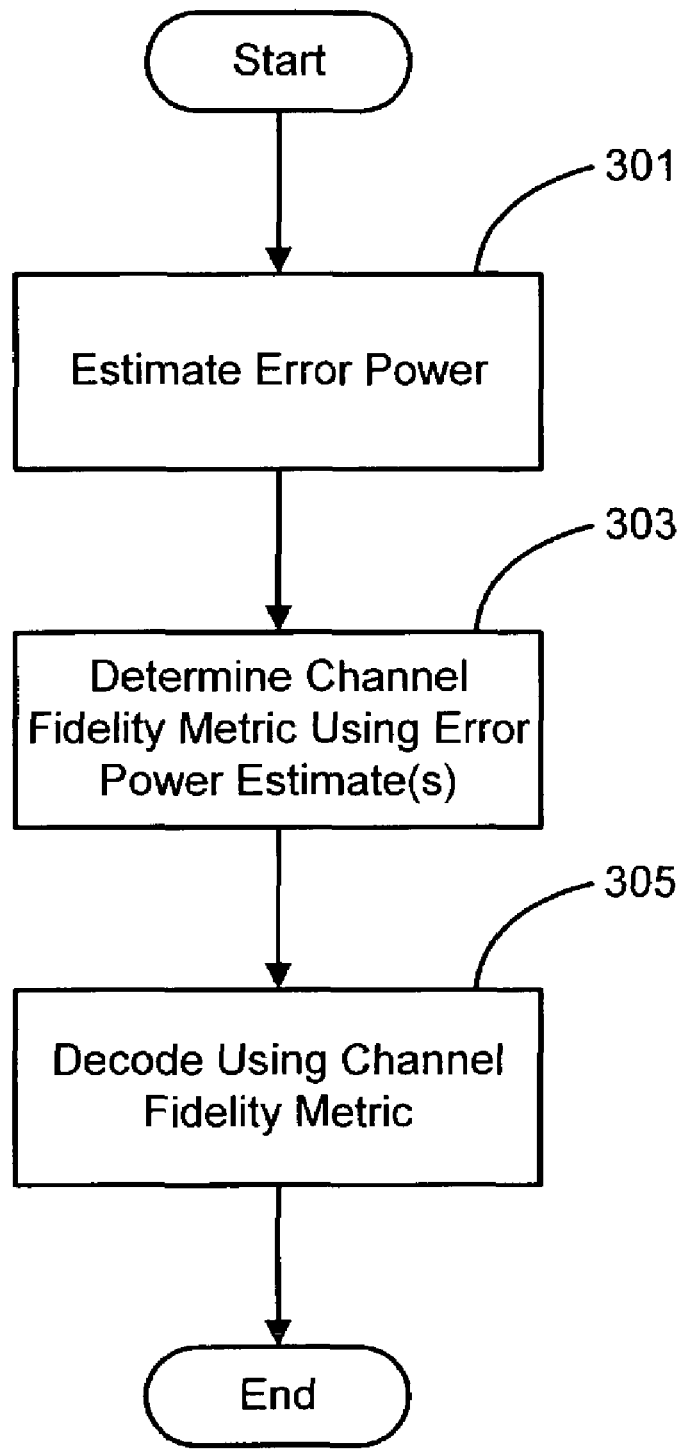
FIG. 3 illustrates a flow diagram of one embodiment of a method that may be performed using the system of FIG. 2, in accordance with the present invention.

FIG. 3 illustrates a flow diagram of one embodiment of a method that may be performed using the system of FIG. 2, in accordance with the present invention. In one embodiment of the method, the error power of an input to the system is estimated as illustrated by block 301, where the input comprises a symbol, a plurality of symbols or one or more sets of symbols, each such set comprising one or more symbols. A fidelity metric is determined, using the error power estimate as illustrated by block 303. The determined fidelity metric is then used to decode the input as illustrated by block 305. The method illustrated in FIG. 3 may be employed on a limited basis, for example only during the presence of the signal of interest for example, or may be employed continuously. In other words, the method specifically illustrated in FIG. 3 may be employed in a continuous loop type fashion, either for a limited or extended period of time. In either case, the error power of the input is estimated over time, and fidelity metrics are determined (each using one or more error power estimates of the input) and used to decode the input over time.

Figure 4:
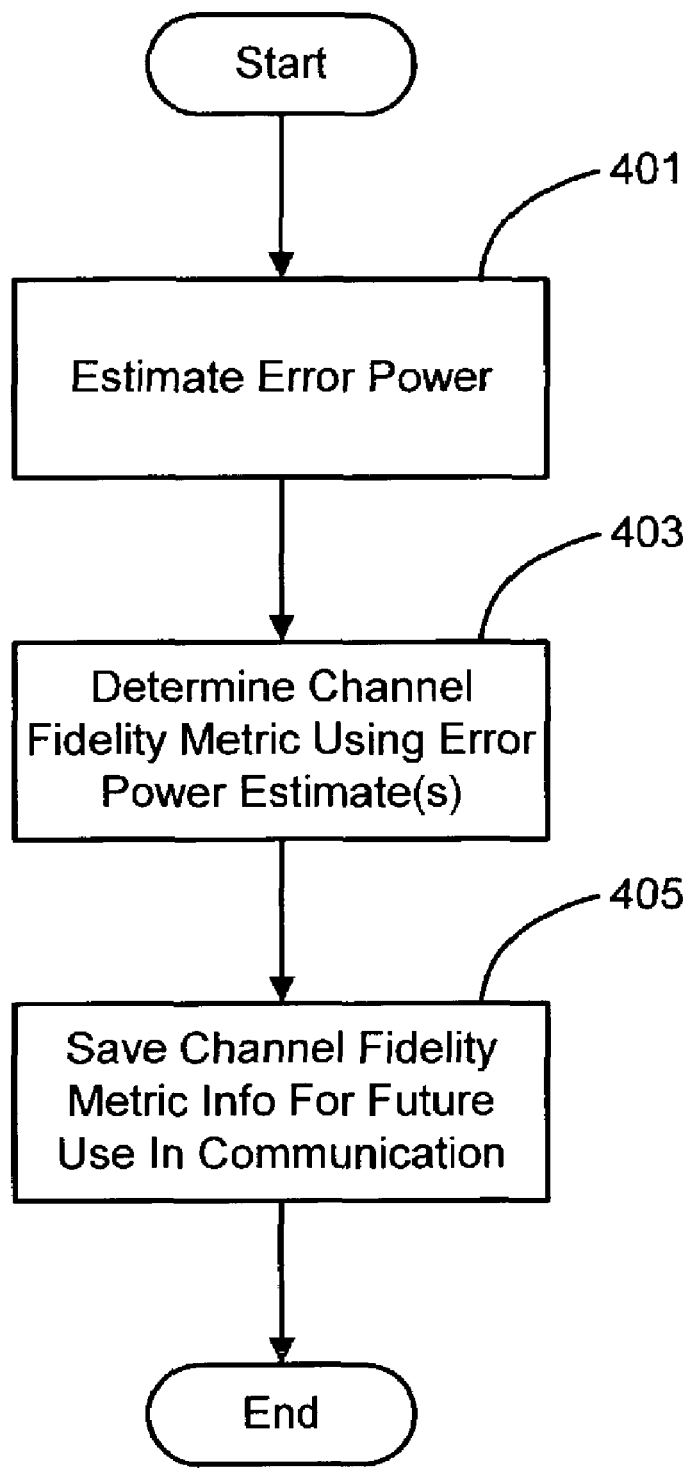
FIG. 4 illustrates a flow diagram of another embodiment of a method that may be performed using the system of FIG. 2, in accordance with the present invention.

FIG. 4 illustrates a flow diagram of another embodiment of a method that may be performed using the system of FIG. 2, in accordance with one embodiment of the present invention. In one embodiment, the error power of an input to the system is estimated as illustrated by block 401. A fidelity metric is determined, using the error power estimate as illustrated by block 403. The determined fidelity metric is then saved or stored for future use in communications as illustrated by block 405. Like the method illustrated in FIG. 3, the method illustrated in FIG. 4 may be employed on a limited basis, such as only during time periods when no signal of interest is present, for example, or may be employed continuously. In other words, the method specifically identified in FIG. 4 may, like that method illustrated in FIG. 3, be employed in a continuous loop type fashion, for a limited or extended period of time. In either case, the error power of the input is estimated over time, fidelity metrics are determined (each using one or more error power estimates of the input) and information about the fidelity metrics stored for future use in communications.

Specifically, the stored information about the fidelity metrics may be used in transmit waveform optimization for example. In other words, the information may be used to determine a waveform that best suits the communication channel given what has been learned about the channel over time, as reflected in the stored fidelity metrics. The stored information about the fidelity metrics may also (or alternatively) be used in selecting receiver algorithms that are robust given the limitations of the channel, again as reflected in the stored fidelity metrics. Additional detail regarding use of catalogued channel fidelity metric information for future communications is provided below.

In one embodiment of the present invention, the methods discussed above with respect to FIGS. 3 and 4 may be used in conjunction with each other. For example, the method of FIG. 3 may be employed when a signal of interest is present, while the method of FIG. 4 may be used when a signal of interest is not present.

The error power estimates provided previously with respect to FIGS. 2 through 4 may be generated in a number of ways, in the presence or absence of a signal of interest. In the absence of a signal of interest, the input power to the receiver may simply be the noise power. Filtering to the bandwidth of the signal of interest may be used if desirable.

In an embodiment where the communication system (similar to the system of FIG. 2) is a digital communications system, one particular method for gathering the error power estimates during signaling is to calculate the distance (squared, for power) between the received signal and the nearest constellation point in the digital system's signaling alphabet. This error vector is typically available or readily obtainable from a slicer in a digital communications receiver.

The length of sliding window 205 of FIG. 2 is important in its selection and application, but in general, may be any length. A shorter window is a subset of a longer window, so longer and longer windows may theoretically provide better and better channel fidelity metrics. However, in practice, the window length should, for example: (1) be sized to accommodate a given or tolerable amount of delay (acceptable to the rest of the receiver processing) in generating the channel fidelity metric; (2) not unduly increase the complexity of the overall receiver; and (3) account for the durations or dynamics expected, or previously observed, in the dominating channel impairments. For example, if transitory channel impairment has duration of up to 10 symbols in a given digital communications system, then it is hard to justify the use of a window of 100 symbols. Similarly, a window of only 4 symbols, with the expectation of a persistence of 10 symbols of a given impairment condition, needlessly lessens the ability of the fidelity processor to make the best channel fidelity assessment, as it is denied relevant or correlated information regarding the channel fidelity.

Many forms are contemplated for processing the sequence of error power estimates in the fidelity processor 207 of FIG. 2. Such forms may depend on: (1) the complexity allowed; (2) the size of the sliding window or duration or persistence of the impairment states; (3) the delay allowed in generating the channel fidelity metrics; and (4) on the use of the channel fidelity metric (i.e., the accuracy of the metric in matching the impairment level).

In its most simple form, the fidelity processor 207 may simply compare each error power estimate against a threshold, and output a binary channel fidelity estimate—i.e., "channel OK," and "channel degraded." While the window in this case consists of a single sample (or a single symbol in the digital communications example), the use of the catalogue of this information, and the beneficial use of this metric in subsequent receiver processing, may be employed in one embodiment of the present invention (such as shown in FIG. 2 and discussed with respect to FIGS. 3 and 4, for example).

Figure 5A:
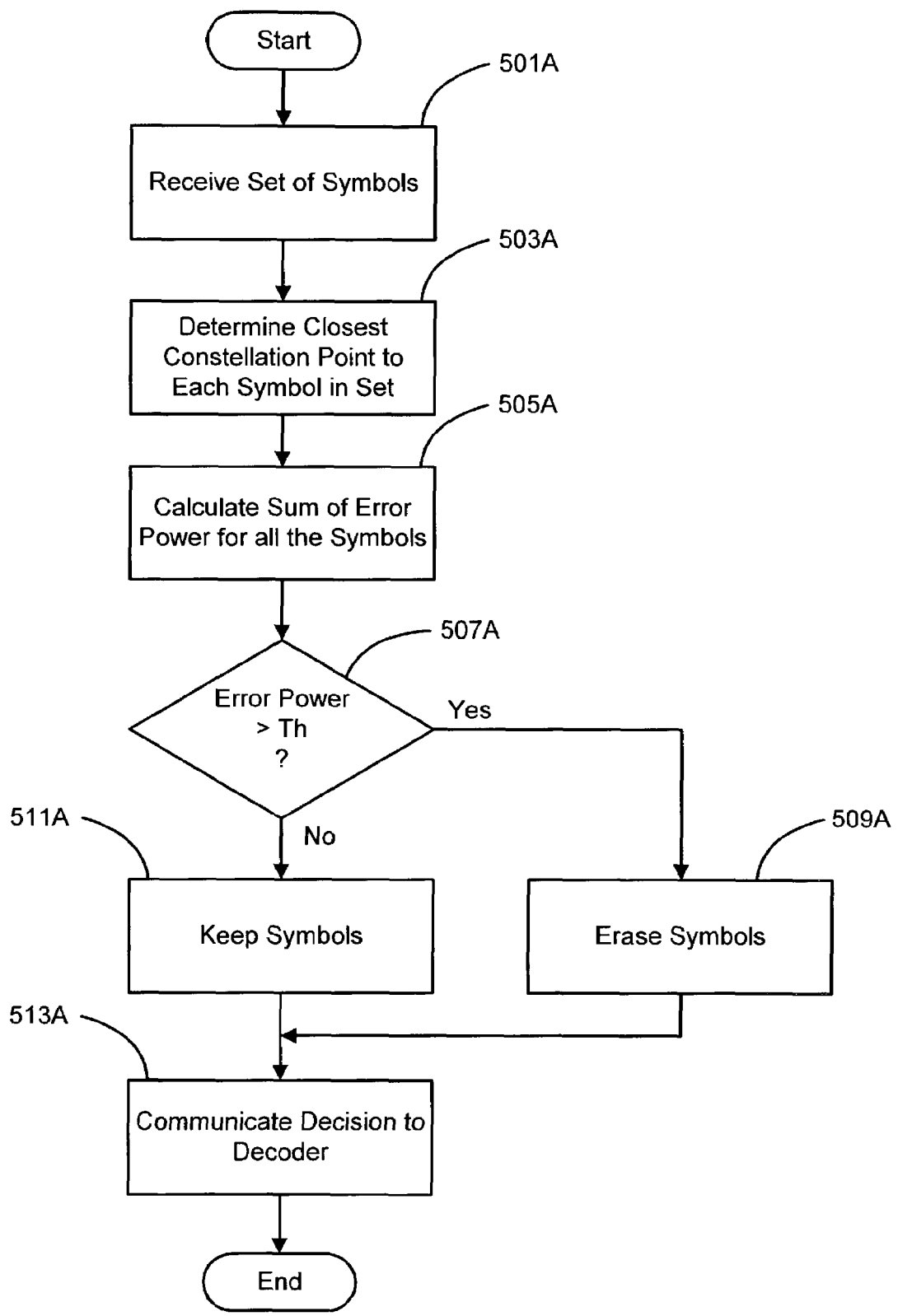
FIGS. 5A and 5B illustrate flow diagrams of specific embodiments of methods of impairment mitigation in accordance with the present invention.

FIG. 5A illustrates a flow diagram of a method of impairment mitigation in accordance with one specific embodiment of the present invention, for use in connection with digital communications. First, a set of symbols is received as illustrated by block 501A, and the closest constellation point to each of the symbols is determined as illustrated by block 503A (i.e. multiple symbols each having a corresponding closest constellation point). As provided previously, the closest constellation point may be determined from a slicer in the receiver.

Next, the error power of the symbols is calculated using, for example, the square of the distance between the received signal and the nearest constellation point in the digital system's signaling alphabet, also as provided previously and as illustrated by block 505A. The sum of the error power of all the symbols is then compared to a threshold of error power as illustrated by block 507A. This is performed, for example, in the fidelity processor. If it is determined that the error power is greater than the threshold (i.e., the error power is too large), it is assumed that the channel is degraded, and all the symbols (i.e., the entire set) are erased (or weighted low likelihood) as illustrated by block 509A. If instead it is determined that the calculated error power of the symbols is not above the threshold (i.e., less than the threshold), it is assumed that the channel is OK, and the symbols are kept as illustrated by block 511A. In either case, the decision is communicated to the decoder as illustrated by block 513A. In other words, if the symbols are kept as illustrated by block 511A, the symbols are simply communicated to the decoder as illustrated by block 513A, whereas if the symbol is erased as illustrated by block 509A, an indication that the symbols have been erased is communicated to the decoder as illustrated by block 513A. This process is repeated for each set of symbols received.

While the method illustrated in FIG. 5A is performed on multiple symbols in a set, it is contemplated that a subset of symbols may be considered. Furthermore, it is contemplated that one or more chip(s) (or other waveforms) may play the roll of a symbol.

Figure 5B:
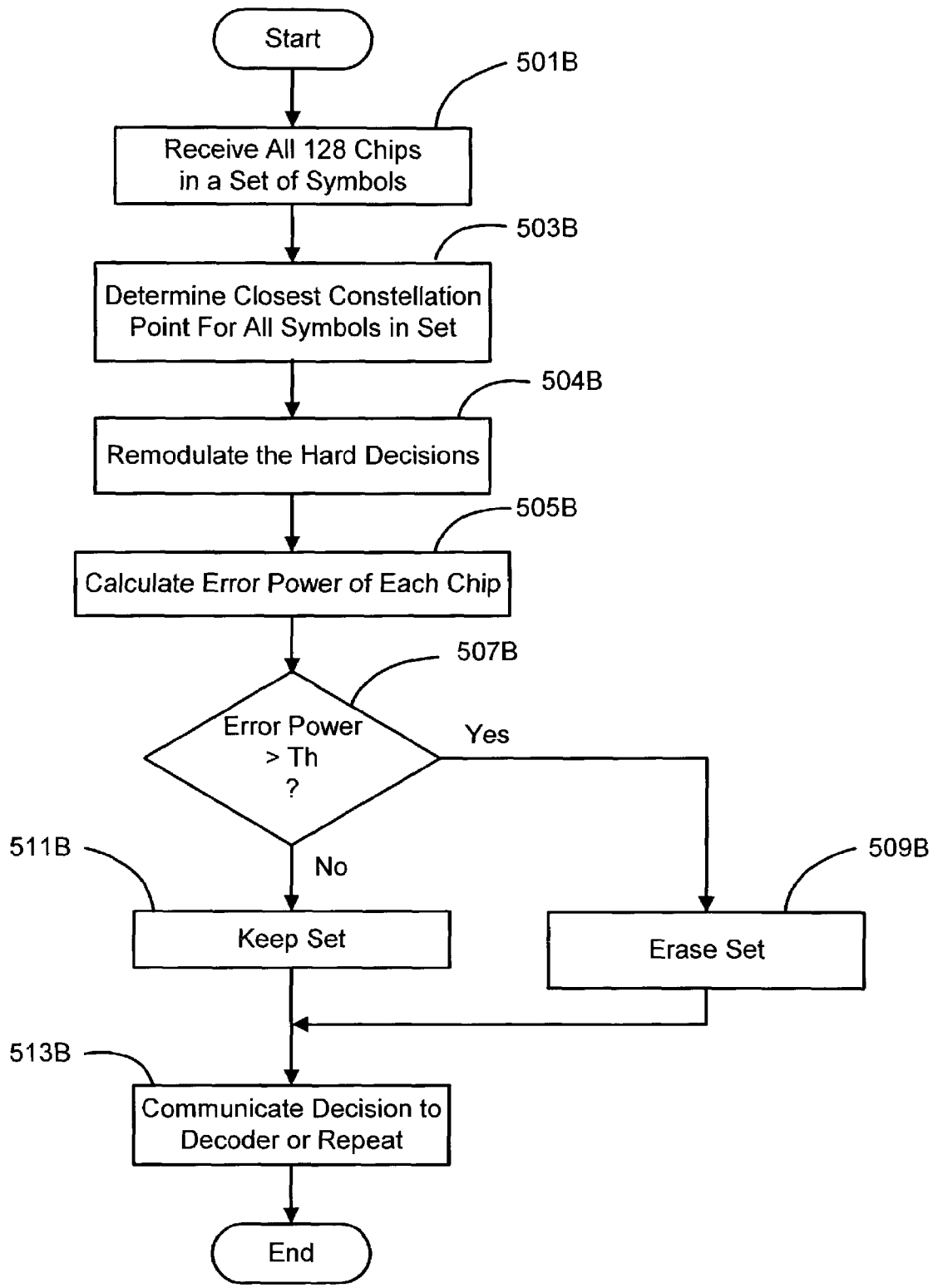

For example, with SCDMA, after hard decisions are made in an iterative process or manner, these hard decisions may be remodulated and the error power calculated for each chip in the spreading interval. FIG. 5B illustrates a flow diagram of a method of impairment mitigation in accordance with one specific embodiment of the present invention. First, all 128 chips in a set are received as illustrated by block 501B, and the closest constellation point to all the chips is determined as illustrated by block 503B. As provided previously, the closest constellation point may be determined from a slicer in the receiver. The hard decisions are remodulated as illustrated by block 504B.

Next, the error power of the chips is calculated as illustrated by block 505B. It is contemplated that blocks 503B and 505B calculate the error power of a chip using the remodulated ensemble set of symbol hard decisions (i.e., the closest constellation point for each of the demodulated spread symbols). The error power of each chip is then compared to a threshold of error power as illustrated by block 507B. If it is determined that the error power is greater than the threshold (i.e., too large), it is assumed that the channel is degraded, and the chips are erased (or weighted low likelihood) as illustrated by block 509B. If instead it is determined that the calculated error power of the chip is not above the threshold, it is assumed that the channel is OK, and the chips are kept as illustrated by block 511B. In either case, the decision is communicated to the decoder as illustrated by block 513B or repeated for multiple iterations. Moreover, the methods provided previously may be employed using different means for calculating the error power and different processing may be used to determine whether or not the channel is OK or whether particular symbol(s) (chips or other waveforms) should be erased or kept. In addition, the method may be employed in connection with analog communications, using samples rather than symbols. As mentioned above with respect to FIG. 4, channel fidelity metric information obtained from the fidelity processor may be stored and used for future communications. In the particular example illustrated in FIGS. 5A and 5B, by analyzing the duty factor of the "channel OK" versus the "channel degraded" condition, and by analyzing the relative persistence of these conditions, the transmitting waveform may be adapted to these parameters. The appropriate amount of parity in FEC coding, and the best choice of interleaver parameters in FEC employing interleaving, are strongly related to these parameters.

Similarly, as provided previously with respect to FIG. 3, the receiver may make use of this information directly. In the example of digital communications, the receiver marks the bits corresponding to the "channel degraded" condition as having very low confidence in subsequent FEC decoding. Reed-Solomon codes may accommodate both error correction and erasure marking in their decoding. By marking Reed-Solomon symbols that contain bits transmitted during "channel degraded" conditions as erasures, the decoder benefits from having more information than a typical Reed-Solomon decoder working with hard decisions only. In other words, using the side information about the channel fidelity, the decoder may produce better results (i.e., higher rate of correct decoding).

A Reed-Solomon decoder may accommodate twice as many erased symbols as it can correct erred symbols, so finding instances of degraded channel fidelity, which often lead to erred Reed-Solomon symbols benefits the decoder, and marking these as erasures, greatly benefits the decoder. If nearly all of the Reed-Solomon symbol errors are attributable to the degraded channel, and if the degraded channel is fairly accurately detected (in the fidelity processor for example), then almost twice as many instances of the degraded condition may be tolerated.

Other examples of fidelity processors include summing the error power estimates in the sliding window, and providing these (or a scaled version such as an average) as the channel fidelity estimate. Alternately, this sum or average may itself be quantized into a binary decision, or a finite number of levels (such as "channel pristine," "channel OK," and "channel degraded" in one example), or even compressed, via a square root operation, for example. If a dominant channel impairment is expected to persist for a duration of many symbols, then summing the error power estimates for at least several symbols increases the accuracy of the channel fidelity metric, especially during the "middle" of the impairment condition.

However, determining the precise moment when the degraded condition is "turned on" and "turned off" may be difficult if a long window for summing is used, without modification. One approach is to increase the time-domain precision of the fidelity processor, is to compute the average error power during a window, and apply two thresholds, one on the average and one on individual samples of the error power estimates. The "channel degraded" assignment is only outputted at times corresponding to samples, where the average error power in the window exceeded threshold #1, AND either (a) the sample was between two samples which exceeded threshold #2, or (b) the sample was the only sample in the window which exceeded threshold #2.

Once again, a particular example may be employed to the summing of the noise power estimates within the window, as provided previously, and this result compared with a threshold. This binary channel fidelity metric is then associated with the middle sample of the window (i.e., where the delay corresponds to half the window duration). With Reed-Solomon FEC, as provided previously, the "channel degraded" associated with any bits in a Reed-Solomon symbol result in that symbol being marked for erasure in the decoding process. The method described above may again be applied to enhance the time-domain precision of the channel fidelity metric.

Figure 6:
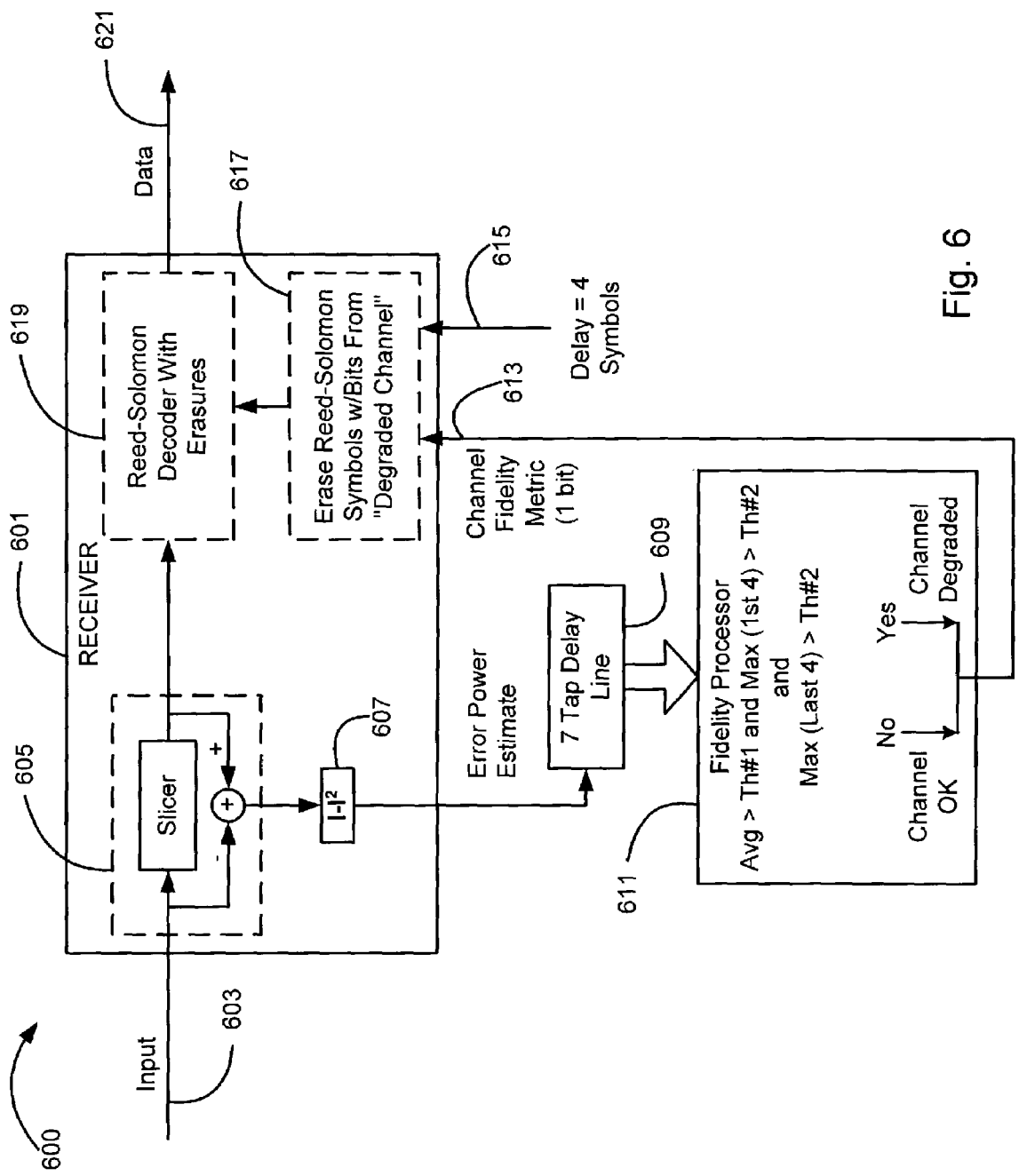
FIG. 6 illustrates a block diagram of another embodiment of an impairment mitigation system in accordance with the present invention.

FIG. 6 illustrates a block diagram of an impairment mitigation system 600 in accordance with a particular embodiment of the present invention. The system 600 (similar to system 200 of FIG. 2) may be contained, for example, in one or both of the communication nodes of FIG. 1. Referring to FIG. 6, a receiver 601 receives at input 603 an input signal and/or noise, in addition to a temporary high-level noise burst, for example. The receiver, using slicer 605 and block 607, generates error power estimates. The receiver generates such error power estimates either using a sequence of bits (using a sequence of symbols is a set, in a digital communications example). A sliding window 609, depicted as a 7-tap delay line, receives the error power estimates, which are then processed in a fidelity processor 611. The fidelity processor 611 continuously generates a metric for channel fidelity as the window (i.e., time) progresses.

Specifically, 7-tap delay line 609 captures 7 consecutive error power estimates at a time, and computes an average error power using the 7 captured estimates. In addition, the highest (maximum) error power of the first 4 captured estimates is determined (i.e., estimates 1 through 4), and the highest (maximum) error power of the last 4 captured estimates (i.e., estimates 4 through 7) is likewise determined. Next, a determination is made whether the average error power calculated is greater than a first threshold, and whether both maximum error powers are greater than a second threshold. If any one is not above its respective threshold, a "channel OK" indication is sent to the receiver 601. If all three are above or greater than their respective thresholds, then a "channel degraded" indication is sent to the receiver 601. This indication may be a simple 1 bit channel fidelity metric (e.g., a "1" for channel OK and a "0" for channel degraded for example). In a digital communications example, the fidelity processor 611 generates a 1-bit channel fidelity metric over time for QAM constellations, for example.

The receiver 601 receives the channel fidelity metric as illustrated by reference numeral 613 and is aware of the 4 sample or symbol delay as illustrated by reference numeral 615. Processing block 617, knowing the channel fidelity metric and the particular set of samples or symbols being considered from the known delay, either erases the particular set of samples or symbols being considered (corresponding to a "channel degraded" fidelity metric), or keeps the particular sample or symbol being considered (corresponding to a "channel OK" fidelity metric). This process is repeated so that the error power estimate corresponding to each set of samples or symbols is considered by the fidelity processor 611. In the embodiment illustrated in FIG. 6, the particular set of samples or symbols being considered by the fidelity processor 611 is that corresponding to the error power estimate found at the $4^{th}$ position in the 7 tap delay line 609 (and hence the 4 sample or symbol delay).

A decoder 619, such as, for example, a Reed-Solomon Decoder, decodes the set of samples or symbols with erasures, as determined by the fidelity processor 611. Many different types of algorithms may be used in the fidelity processor to generate fidelity metrics. Decoded data, an estimate of the transmitted signals for example, is outputted at output 621 of the receiver 610. It is contemplated that the functionality of processing block 617 may be part of the decoder 619. It is also contemplated that means other than as shown in, or specifically discussed with respect to, FIG. 6 may be used to calculate error power and to generate the fidelity metric. Further, quantities other than 7 may be used for the tap delay line.

In addition, while FIG. 6 illustrates a system having some components and functionality located outside of the receiver, it should be understood that such system may have additional components or functionality located within the receiver, or may in fact be entirely contained within the receiver. In addition, it should also be understood that the estimation of the error power and the processing depicted as being performed within the receiver of FIG. 6, may instead be performed outside of the receiver.

Figure 7A:
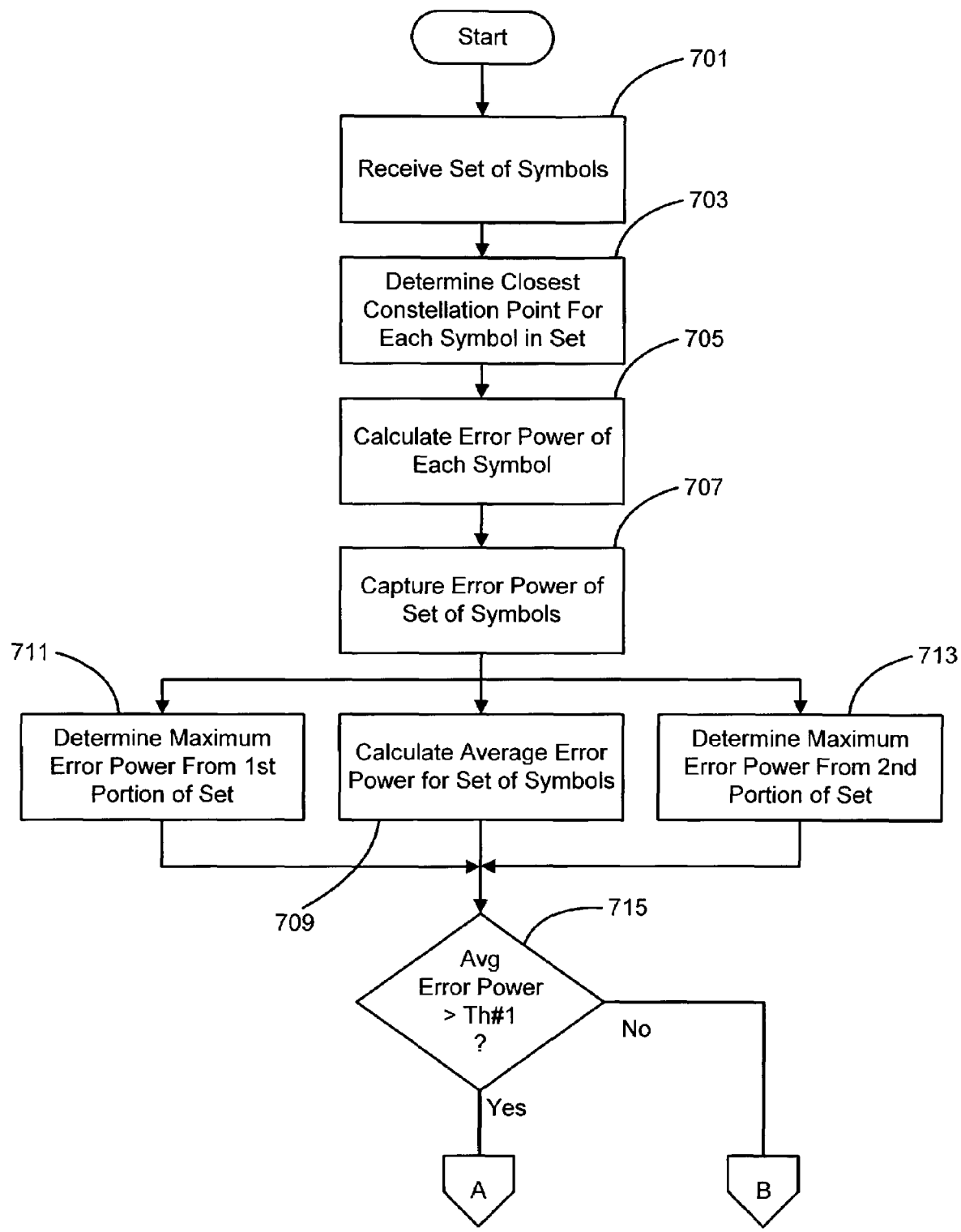
FIGS. 7A & 7B illustrate a flow diagram of one specific embodiment of a method of impairment mitigation for use in connection with digital communications in accordance with the present invention.
Figure 7B:
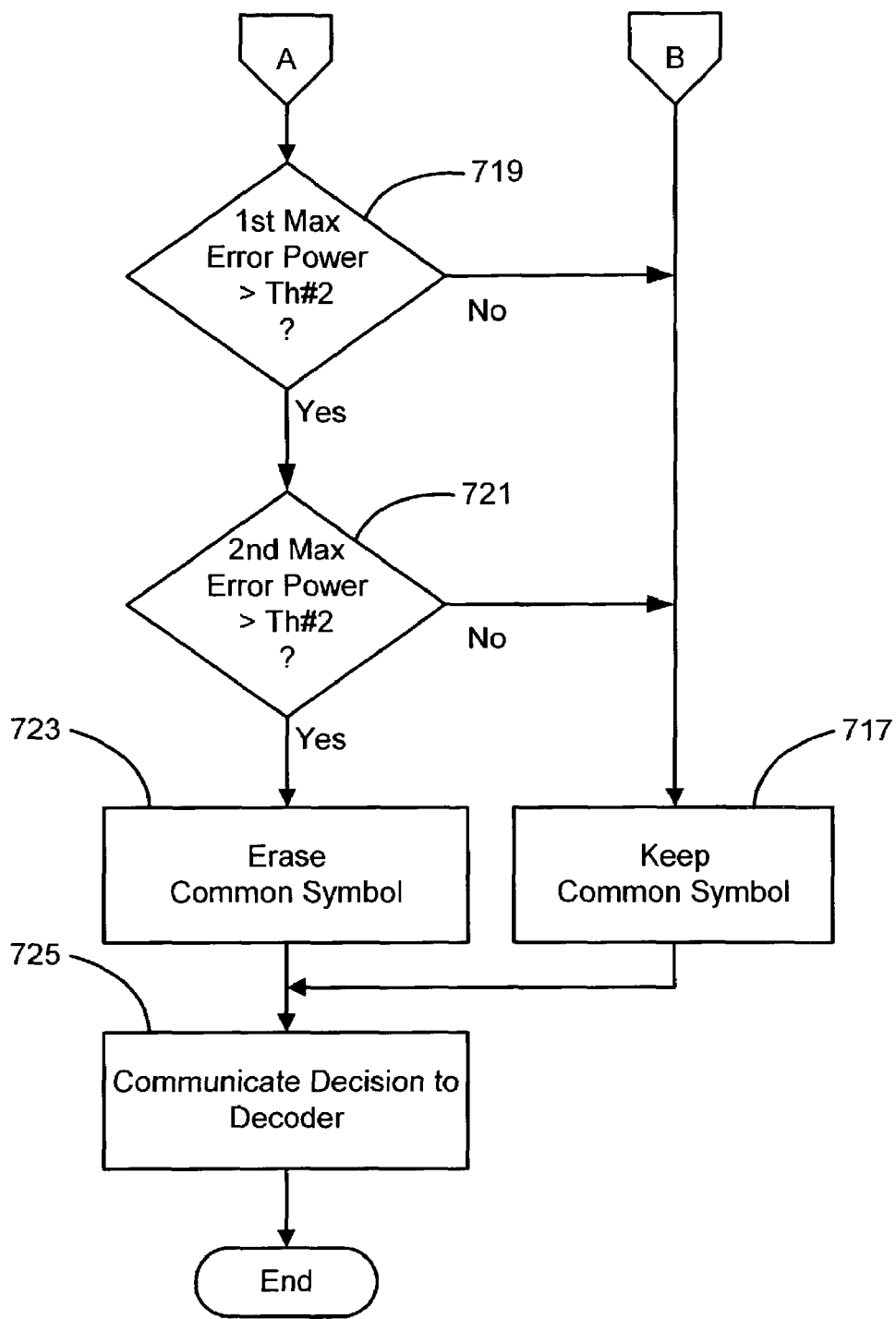

FIGS. 7A & 7B illustrate a flow diagram depicting a method that may be employed using the system of FIG. 6, in a digital communications embodiment of the present invention. A set of symbols is received as illustrated in block 701, and the closest constellation point to each symbol in the set is determined as illustrated in block 703. The error power of each symbol in a set is calculated, for example, using the square of the distance between the received symbol and the nearest constellation point in the digital system's signaling alphabet, as provided previously and as illustrated in block 705. Of course, other methods of calculating or estimating the error power of each symbol in the set may be used.

Next, the error power of a set of symbols is captured as illustrated in block 707, and an average power of the captured set is calculated as illustrated in block 709. In addition, a maximum error power from a first portion of the set is determined as illustrated in block 711, and a maximum error power from a second portion of the set is likewise determined as illustrated in block 713.

The first and second portions of the set each include a common symbol that is the "middle" symbol of the whole set (i.e., the last symbol of the first portion and the first symbol of the second portion for example). In other words, for a set of length n, an odd number, the middle symbol may be defined by $1+(n-1)/2$. It is this number that defines the symbol that is being considered as well as the symbol delay for decoding purposes. Again, as provided previously with respect to FIG. 6, the set length may be 7, which makes symbol 4 the symbol that is being considered, and defines the decoder delay to be 4 symbols. It is contemplated that even numbers may be used for window length, too, and the symbol (or sample) under consideration need not be the one in the center of the window. The use of an odd window length and center symbol (sample) for which the channel fidelity is being estimated is provided only as an example.

The average error power of the sequence is then compared to a first threshold as illustrated in block 715. If the average is not above the first threshold, the common symbol is kept as illustrated in block 717, otherwise, the maximum error power of the first portion of the set is compared to a second threshold as illustrated in block 719. If that first maximum is not above the second threshold as illustrated in block 719, the common symbol is kept as illustrated in block 717, otherwise, the maximum error power of the second portion of the set is compared to the second threshold as illustrated in block 721. If that second maximum is not above the first threshold, the common symbol is kept; otherwise, the common symbol is erased. In any case, the decision of whether to erase or keep the common symbol is communicated to the decoder as illustrated in block 725. The process is then repeated, so that each set received is at some point considered (i.e., each received symbol is the common set for one iteration of the process).

For a 16 QAM constellation for example having a constellation RMS power of 3.162 (i.e., the square root of 10) and, for example, a 7-symbol sequence, the first threshold may be 0, and the second threshold may be 0.64, for example. Of course, the second threshold may be set to 0, such that just the average error power of the whole sequence is used.

Figure 8A:
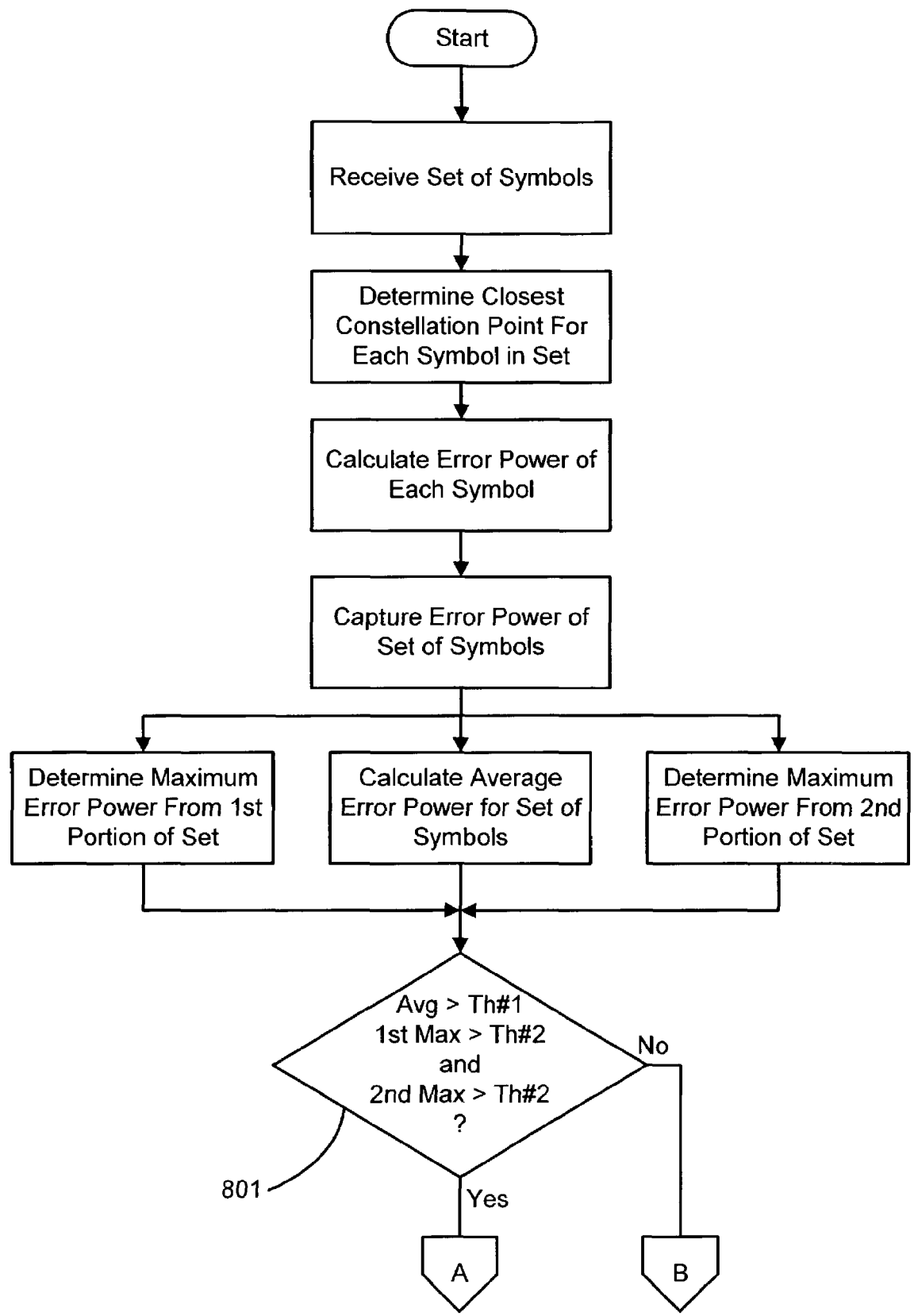
FIGS. 8A & 8B illustrate a flow diagram of one embodiment of a method of impairment mitigation used in connection with digital communications in accordance with the present invention.
Figure 8B:
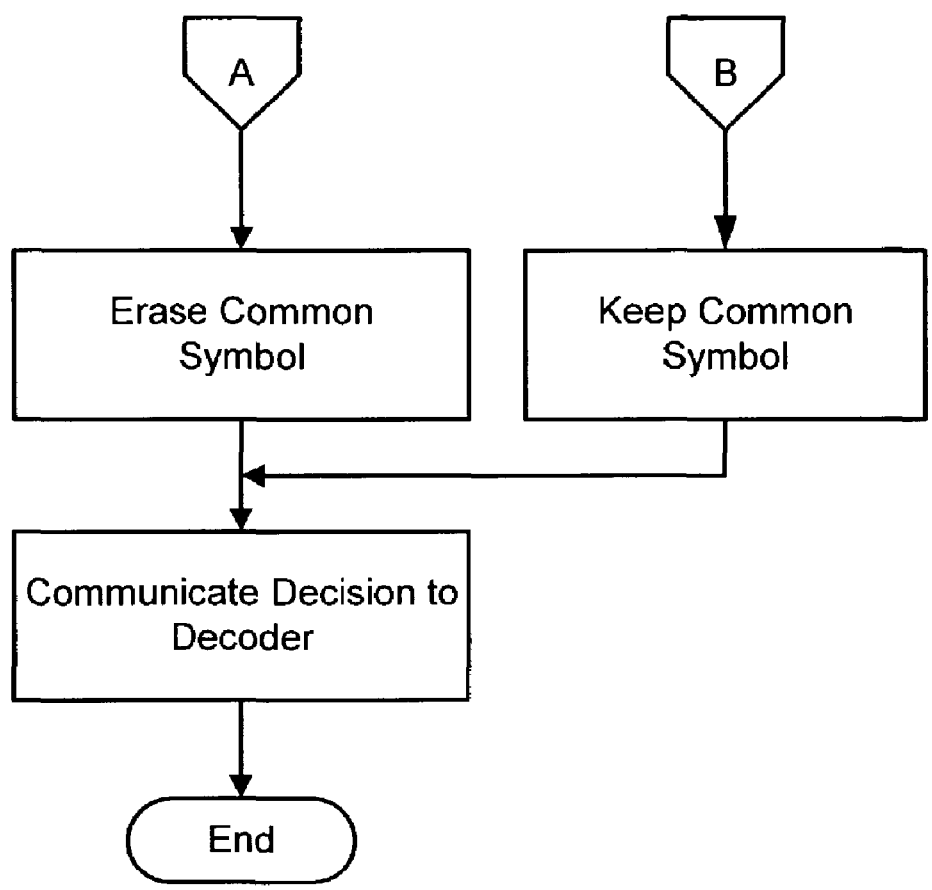

While the decisions made by blocks 715, 719 and 721 of FIGS. 7A-7B are shown to be in a particular sequence, any order of those decisions may be employed. In addition, those decisions may instead be performed simultaneously, rather than sequentially, as shown in FIGS. 8A-8B. Specifically, decision block 801 of FIG. 8A replaces the decision blocks 715, 719 and 721 of FIGS. 7A-7B. A single determination is made at block 801 of FIG. 8A, based on the three comparisons, whether the common symbol should be erased or kept.

Another specific example illustrating applying the channel fidelity metric to enhance the receiver processing follows with the summing of the error power over a sliding window. Especially with high density constellations, and with an impairment of low power or one such as gain compression, where the impairment likely does not cause the received, distorted signal to fall outside the normal signaling constellation, the fidelity processor may determine the presence of the impairment, but a significant fraction of the error power estimates may be rather small (since the received signal falls close to one of the many wrong symbols). In such instances, even using convolutional coding FEC and traditional Viterbi decoding, the branch metrics in the decoding process are not the most accurate reflection of the state of the channel fidelity when they are simply the error power estimates or log of error power estimates (for each symbol) from the slicer. Knowing that a degraded channel condition existed even when a signal was received "close" to a constellation point may be very beneficially used in the decoding, especially when "channel interleaving" is performed prior to the decoding, thus dispersing the impacted symbols.

Figure 9:
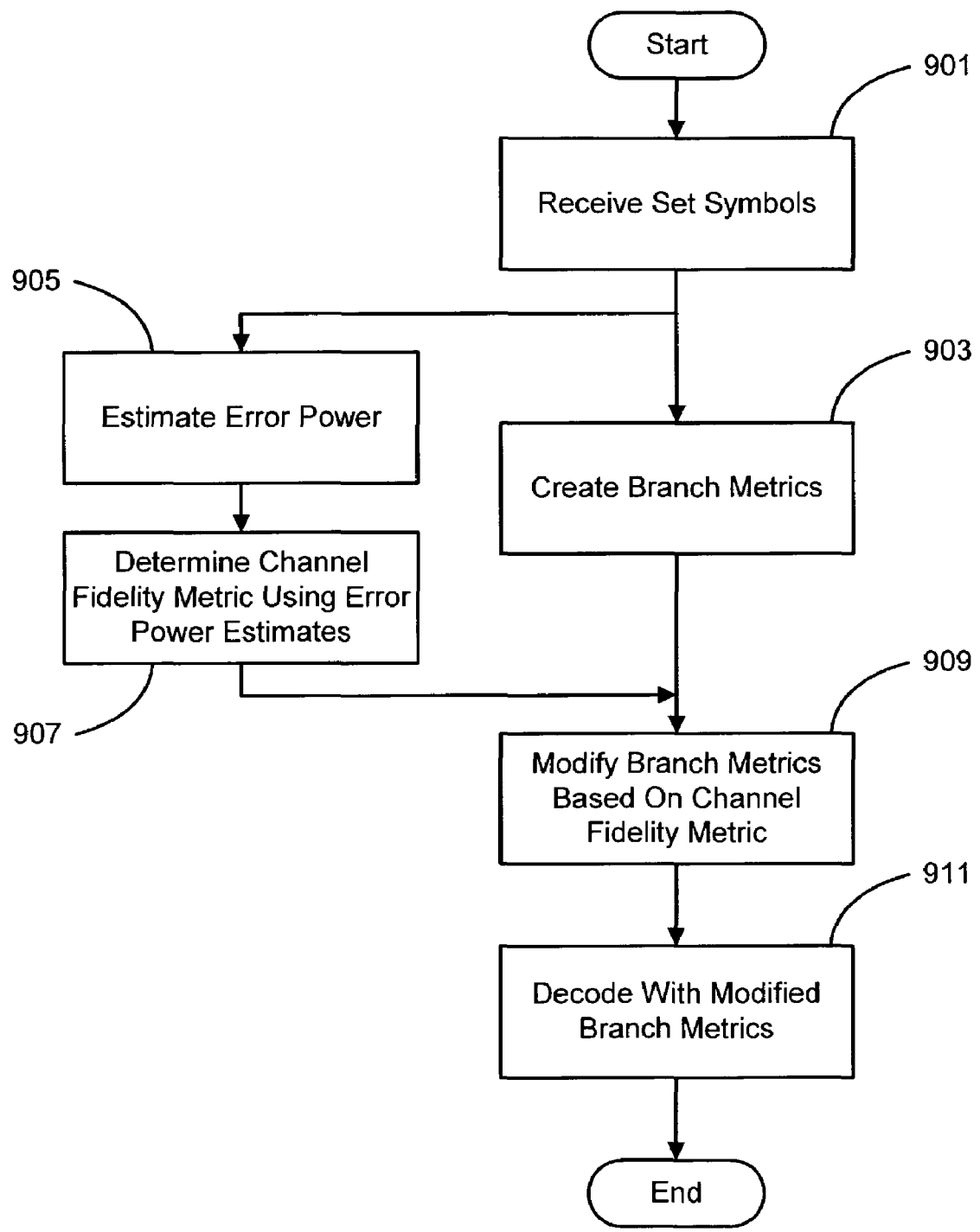
FIG. 9 illustrates a flow diagram of one embodiment of a method that uses a fidelity metric to modify branch metrics in the decoding process, in accordance with the present invention.

FIG. 9 illustrates a flow diagram illustrating a method that uses a fidelity metric to modify branch metrics in the decoding process, in accordance with one embodiment of the present invention. First, a set of symbols is received as illustrated in block 901, error power estimates are estimated or determined as illustrated in block 903, and channel fidelity metrics are determined using the error power estimates as illustrated in block 905. This may be achieved using any means provided herein, for example. In addition, branch metrics are created as illustrated in block 907. For example, in a Viterbi decoder example, branch metrics are created for the Viterbi decoder branches. (Scaled logarithms of the error power are typically used). The Viterbi branches are normally inversely related to the error power from various constellation symbols, since the branch metrics represent the likelihood of the branch transition.

Once such branch metrics are created as illustrated in block 907, the branch metrics are modified based on the channel fidelity estimate as illustrated in block 909. For example, the branch metric may be set to a low probability value if the channel fidelity is determined to be poor. Finally, decoding (Viterbi decoding for example) is performed using the modified branch metric as illustrated in block 911. This overall process may then be repeated.

As mentioned previously, various embodiments of the present invention provide for a fidelity processor that examines a sliding window of error power estimates to yield a channel fidelity metric. While specific fidelity processing examples have been discussed above, still other types of fidelity processing may be employed in connection with the various embodiments of the present invention. For example, median filters or other ranking devices may be used. In a median filter, the middle ranked value within a window is output. Once again, as above, this value could be output "as is," or quantized with various thresholds, perhaps into a single binary output.

Other forms of nonlinear filtering may also serve as useful fidelity processors. For example, the error power estimates may be quantized to a binary level with a threshold, i.e., "'1" for greater than threshold and "0" for less than threshold, and these quantized samples filtered or averaged. This would simplify the "averaging" complexity, and a second threshold as described above may be applied to enhance the precision of marking the "turn on" and "turn off" of the severe impairments.

Still other types of fidelity processing may include, for example: (1) summing; (2) ranking; (3) thresholding and summing; (4) summing and twice thresholding (sum and individual points in the window); (5) quantizing the error power estimates or otherwise nonlinearly processing them (e.g., square root or log); (6) averaging across the window and taking the maximum of the average and (some factor multiplying) the middle error power estimate in the window; (7) taking the maximum of the median ranked value in the window and (some factor multiplying) the middle error power estimate in the window; (8) nonlinearly processing the error power estimates and averaging; and (9) quantizing the results from the aforementioned operations and/or nonlinearly processing them.

Furthermore, the channel fidelity metric may be used to analyze channel behavior. More specifically, the channel fidelity metric may be used to analyze for example duration and fraction of time of impaired conditions compared to unimpaired conditions, especially for determining most suitable FEC and symbol rates and constellation sizes, etc., for the dynamically varying channel. In addition, the channel fidelity metric may be applied to the receiver for beneficial use of processing signals received contemporaneously with the channel fidelity estimate. Some examples of using the channel fidelity metric to enhance receiver performance include: (1) marking Reed-Solomon symbols for erasure in a Reed-Solomon decoder capable of erasure and error correction decoding, and (2) in convolutional coded FEC (or other soft-decision decoders, such as Turbo decoding), affecting the soft-decision metric for a symbol with this additional channel fidelity metric.

This latter embodiment especially benefits from this technique if channel interleaving is performed on the symbol soft-decisions prior to the decoding. Various embodiments of the present invention are especially effective at enhancing receiver performance with temporary high-level impairment duration of multiple symbols, and with high density signaling constellations, as seen in these particular examples.

While the error power estimates provided previously above have been generated outside of the decoding process, decoding may be used to generate a potentially improved error power estimate. In other words, another method for generating the error power estimate includes actually performing a preliminary decoding (if FEC is employed), or partial decoding, and performing a better estimate of the transmitted waveform to more accurately estimate the error power. Such an approach means that there may be delays in the generation of the error power estimates, but often this is not a constraint. A second-pass at the decoding, now with the benefit of the channel fidelity metric (versus time) arising from the firstpass error power estimates, provides enhanced performance in the time-varying impairment scenario.

Figure 10:
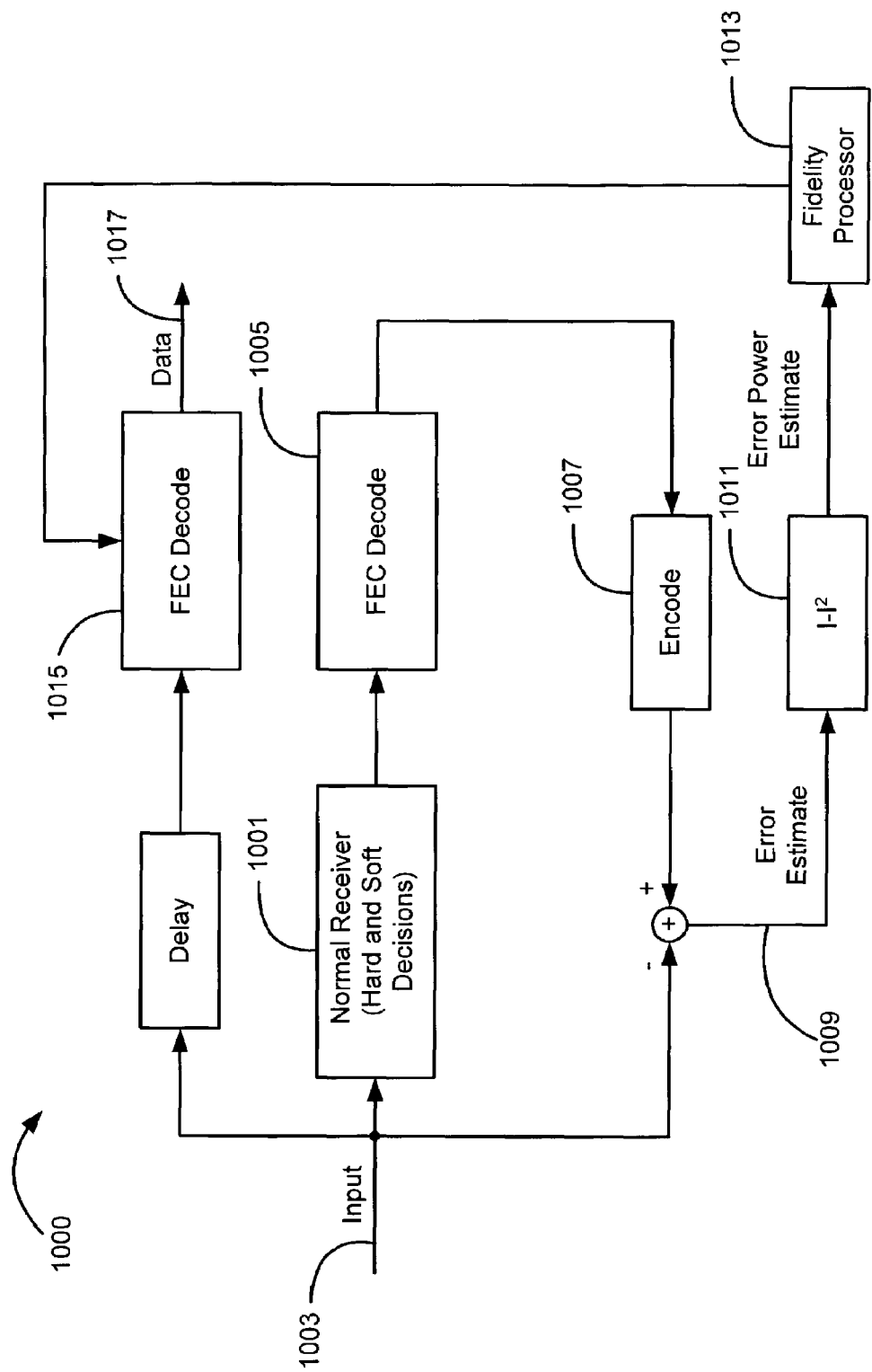
FIG. 10 illustrates a block diagram of one embodiment of an impairment mitigation system that uses preliminary decoding in generating error power estimates, in accordance with the present invention.

FIG. 10 illustrates a block diagram of an impairment mitigation system 1000 that uses preliminary decoding in generating error power estimates, in accordance with one embodiment of the present invention. The system 1000 may be contained, for example, in one or both of the communication nodes of FIG. 1. A receiver 1001 receives an input 1003 containing one or more sets of symbols, each set comprising one or more symbols, and performs normal hard and soft-decisions. The information is then FEC decoded in FEC decoder 1005, and the information is then re-encoded by encoder 1007. The re-encoded information is then used along with the original input at 1003, to generate an error estimate as illustrated by reference numeral 1009, which in turn is used to calculate an error power estimate as illustrated by reference numeral 1011.

A fidelity processor 1013 uses the error power estimate to generate a channel fidelity metric, such as provided previously. FEC decoder 1015 uses the channel fidelity metric, along with the original, delayed input to decode the input, and output decoded data (i.e., an estimate of the transmitted signal) at output 1017. It is contemplated that the FEC decoder 1005 and FEC decoder 1015 may be separate units or devices, or combined into a single decoder.

Figure 11:
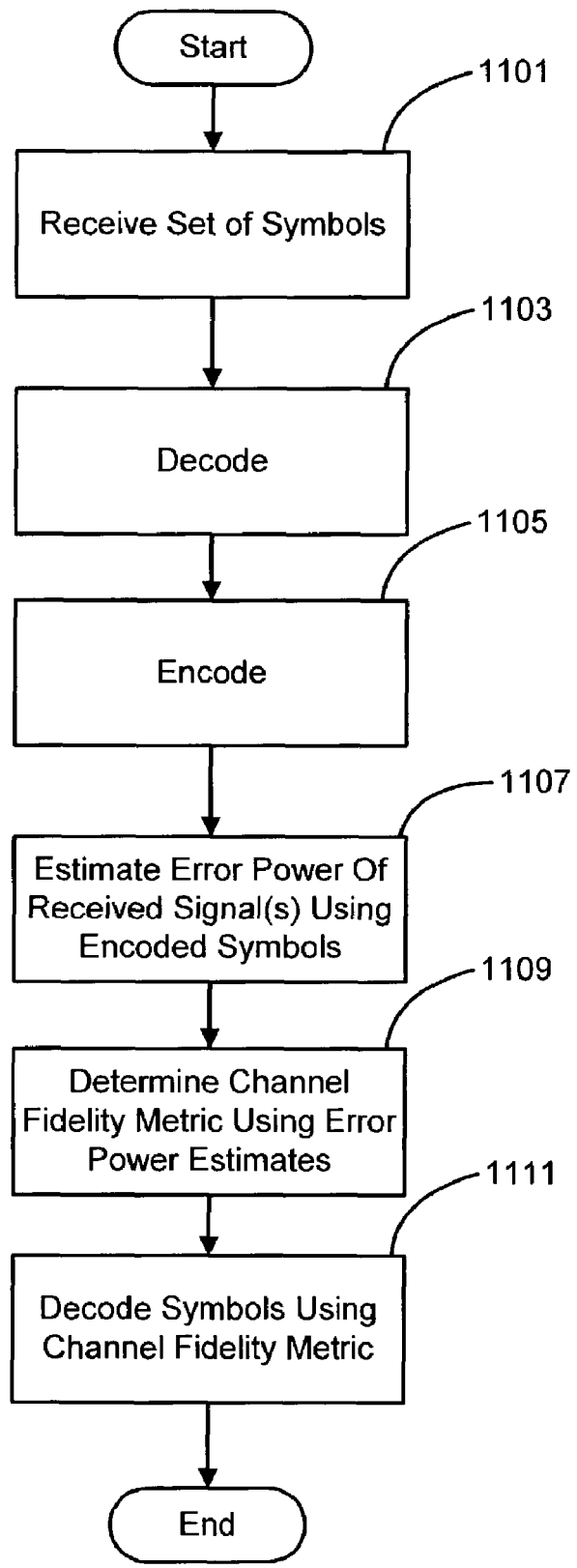
FIG. 11 illustrates a flow diagram illustrating one embodiment of a method of impairment mitigation that may be employed using the system of FIG. 10 in accordance with one embodiment of the present invention.

FIG. 11 illustrates a flow diagram depicting one embodiment of a method of impairment mitigation that may be employed using the system of FIG. 10, for example. One or more sets of symbols are received as illustrated by block 1101, are decoded as illustrated by block 1103 and then encoded as illustrated by block 1105. The error power of the symbols in the received set(s) of signals is then estimated using the encoded symbols as illustrated by block 1107. A channel fidelity metric is then determined using the error power estimates as illustrated by block 1109, and the symbols are decoded using the channel fidelity metric determined as illustrated by block 1111. If at block 1103 it is determined that particular received symbols cannot be decoded and thus re-encoded, then those particular set of symbols are simply erased for estimation of error, for example.

As may be understood upon reviewing FIG. 10 and 11, the system of FIG. 10 and method of FIG. 11 determine a fidelity metric after an initial decoding, and use it to perform a subsequent decoding. Multiple iterations of this process may be beneficial in some embodiments.

Based on the above, various embodiments of the present invention provide means for characterizing the transitory nature of the high-level impairments (i.e., to develop knowledge) characterizing not just typical or even average levels of impairment, but an understanding and characterization of the dynamic behavior of the impairment. With this knowledge, it is possible to facilitate improved communications in the channel, either by adjusting the transmission signal design, or by altering or adjusting the receiver processing, or both.

If the dynamic nature of the impairments is so rapid that it transitions from benign to severe and back to benign again, faster than the receiver can determine and communicate this degradation back to the original transmitter in the channel, then any adjustments in the transmission waveform are "permanent," in the sense that adaptation to the temporarily degraded channel is precluded by the dynamics. Still, the optimal transmission waveform may be different if and when it is learned that the channel contains some severe but transitory impairment(s). Thus, it benefits the communications system to learn and characterize the transitory nature of the impairments, leading to a superior transmit waveform with this new knowledge.

While some situations may preclude the feedback and adjustment of the transmit waveform for adapting to a temporary increase of an impairment, in such situations, the receiver may still benefit from this knowledge.

Another embodiment of the present invention relates to the detection and mitigation of temporary impairments in information transfer between a plurality of CMs and/or CMTS. More specifically, one embodiment of the present invention relates to some kind of distortion inducing mechanism of one up to several chips (16 chips for example), which introduces a brief, temporary distortion during the operation of a communication system similar to that described previously. This embodiment uses 128 chips to send a multiplicity of symbols simultaneously during a fraction of that frame. If the communication is subjected to a brief, temporary distortion, noise for example, the suspect (disturbed) chips are identified and blanked.

However, blanking the impacted chips may affect the orthogonal spreading codes, such that they are no longer orthogonal. For example, if six chips are blanked out, then processing the remaining 122 of the 128 chips does not result in a zero value (perfect orthogonality) for one spreading code passing through another spreading code's matched filter (wipeoff), unless the six blanked chips included three agreements and three disagreements between the two codes (an unlikely occurrence). More likely, there are an unequal amount of agreements and disagreements between the two codes in the blanked chip, which then results in ICI. In other words, a remnant of one code's symbol shows up at another code's matched filter output.

Figure 12:
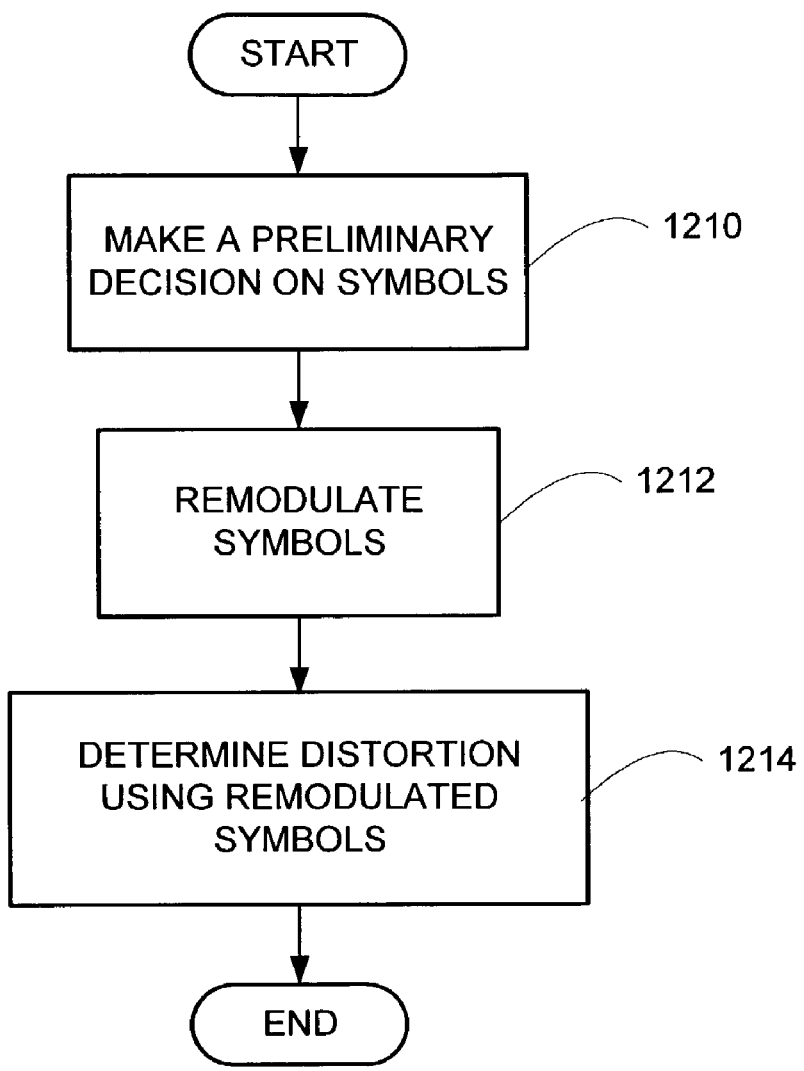
FIG. 12 illustrates a high-level flow diagram illustrating one embodiment of an alternate method of impairment mitigation that may be employed using a system similar to that illustrated in FIG. 10 in accordance with the present invention.

FIG. 12 illustrates a high level flow chart depicting a method for detecting a set of impacted chips or symbols in accordance with one embodiment of the present invention. The illustrated method includes making a preliminary decision on at least one set of one up to 128 chips, symbols or waveforms transmitted in one set as illustrated by block 1210. These chips in the set are then remodulated, in one embodiment using spreading codes, as illustrated by block 1212. Then, a determination of the distortion or noise may be made at each chip position, between the remodulated waveform and the received waveform as illustrated by block 1214. One or more of the techniques provided previously may be applied to this distortion embodiment. In one embodiment, these techniques may be applied repeatedly. In other words, this process may be repeated for multiple iterations.

Figure 13A:
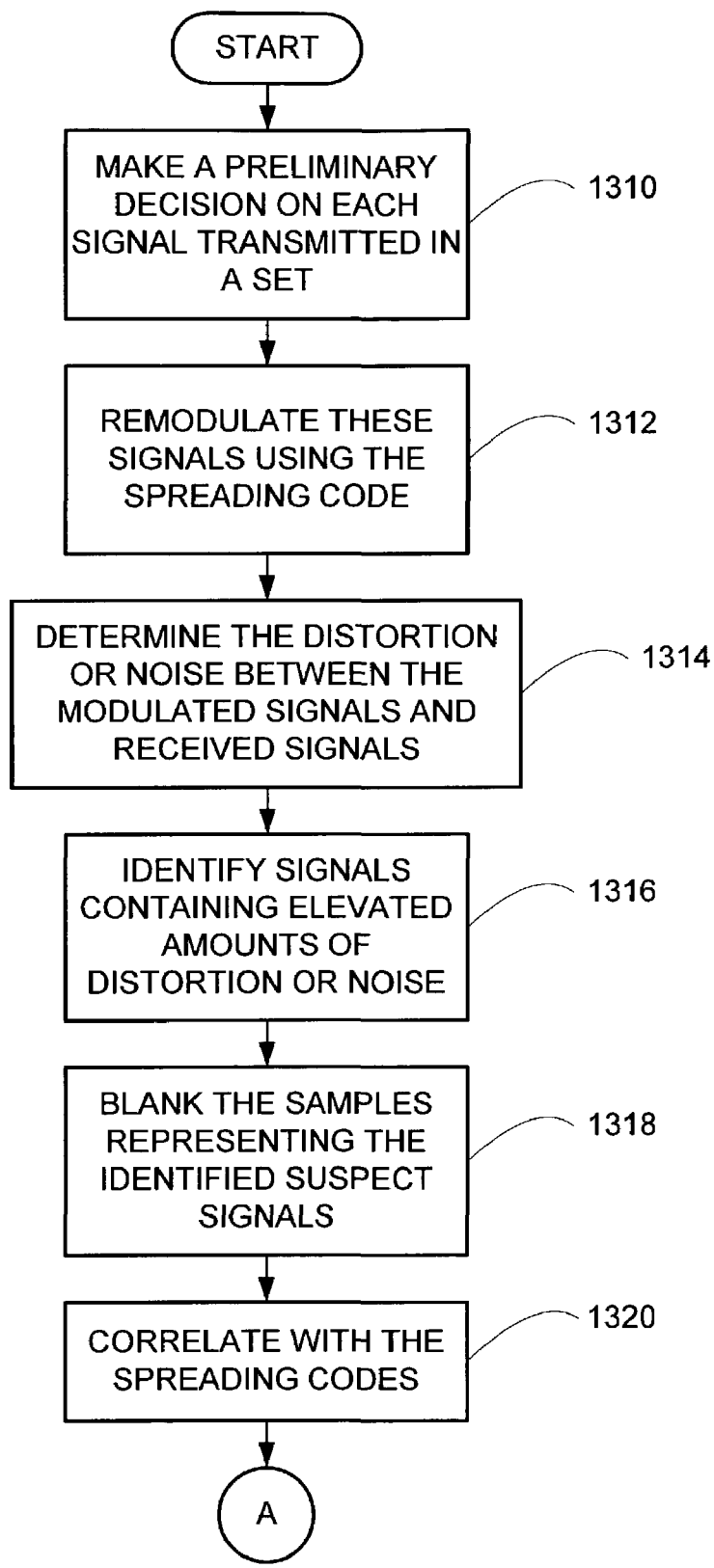
FIGS. 13A & 13B illustrate a flow diagram illustrating an alternate embodiment of a method of impairment mitigation similar to that illustrated in FIG. 12 that may be employed using a system similar to that illustrated in FIG. 10 in accordance with the present invention.
Figure 13B:
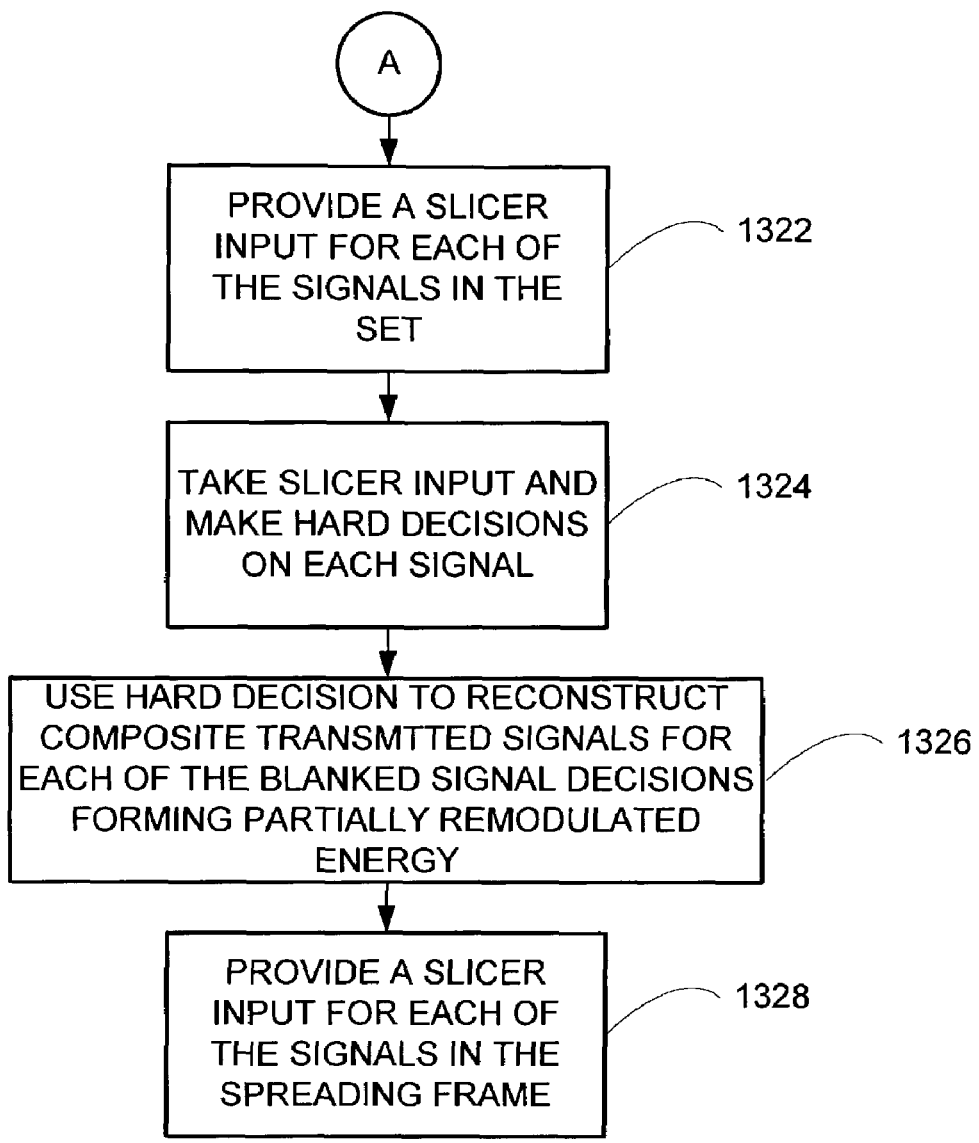

FIGS. 13A & 13B illustrate a detailed flow chart depicting an alternate method for detecting impacted signals in a set (similar to that illustrated in FIG. 12) in accordance with one embodiment of the present invention. This method illustrated in FIG. 13 includes making a preliminary decision on each signal (for example, chips, symbols, waveforms, etc.) transmitted in at least one set as illustrated by block 1310. Such preliminary decisions may include blanking the suspect chips using burst noise detection as provided above or may include using raw received signal.

These signals are remodulated using spreading codes as illustrated by block 1312. Remodulating the signals may include putting the signals through a plurality or bank of mass filters and producing a parallel set of slicer inputs. A determination regarding the distortion or noise is made between the remodulated signal and the received signal regarding each signal as illustrated by block 1314. Such determination may include taking the missing signals, wiping them off and recreating them, and determining a likelihood ratio. Further, one or more of the techniques provided previously and as set forth in the Detection and Mitigation and the Blanking and processing application, may be re-applied to such distortion estimate. These processes may be repeated for multiple iterations. At the end of one or more passes or iterations, a set of signals may be identified as containing or being suspected of containing elevated amounts of distortion and/or noise as illustrated by block 1316.

The illustrated method continues, blanking the samples that represent the identified suspect signals as illustrated by block 1318. In this embodiment blanking means are used to set the received signal to a value of zero for the identified suspect signal. The signals are correlated with the spreading codes as illustrated by block 1320, providing a parallel set of inputs to one or more slicers for each of the symbols in the set (e.g., spreading frame, 128 symbols) as illustrated by block 1322.

A hard-decision is made on each signal in the set using at least one but up to 128 of the slicer inputs as illustrated by block 1324. Such hard-decisions are then used in a Partial Remodulator (alternatively referred to as "PRM") wherein the composite transmitted value is reconstructed for each of the blanked signals, forming Partially Remodulated Energy (alternatively referred to as "PRME") as illustrated by block 1326. In one embodiment, this assumes that such hard-decisions are the actual transmitted signals. The PRME is correlated with the blanked positions or signals for each of the spreading codes, and at least one set of at least one but up to 128 partial correlation results (alternatively referred to as "Partial Correlation Results" or "PRCs") are added to the previously obtained blanked slicer inputs as illustrated by block 1328. This new set of at least one but up to 128 slicer inputs (alternatively referred to as "First Iteration Blanking-Repaired" or "$1^{st}$ IBR" slicer inputs), is then "hard-decisioned." This blanking-repaired set of decisions may be used as the receiver hard-decisions. However, in another embodiment the process may continue with at least one more iteration.

In a second iteration, the hard-decisions from the $1^{st}$ IRB slicer inputs are used in the PRM and the resulting PRME is correlated with the blanked positions or signals. This set of at least one but up to 128 partial correlation results (alternatively referred to as "$2^{nd}$ PRCs") is added to the blanked slicer inputs. In one embodiment, the $2^{nd}$ PRCs are added to the original blanked slicer inputs. This addition results in at least one set of one but up to 128 new slicer inputs (alternatively referred to as the "$2^{nd}$ IBR slicer inputs"). These $2^{nd}$ IBR slicer inputs are than "hard-decisioned." These latest hard-decisions may be the final hard-decisions, or another iteration may be performed.

In subsequent iterations, the hard-decisions from the Nth IBR slicer inputs are again passed to the PRM, and the resulting PRME is correlated with the blanked signals or chip positions, yielding N+$1^{st}$ PRCs. In one embodiment, the N+$1^{st}$ PRCs are added to the original blanked slicer inputs, producing N+$1^{st}$ IBR slicer inputs. Such N+$1^{st}$ IBR slicer inputs may again be "hard-decisioned". This blanking-repaired set of decisions may again be used as the receiver hard-decisions.

The process may, in one embodiment, continue for a specific number of iterations (one or two iterations for example) or end when stability is reached. In one or more embodiments of the present invention, stability is defined as reaching the same hard-decisions in two successive iterations, however other ending criteria are contemplated. It is also possible to execute one or more of the previously described iterations and use such hard-decisions as feedback to a burst noise estimator (not shown). Such burst noise estimator may be used to refine the estimate of which set of signals or chips were indeed impacted by increased distortion/noise. Then the iterative processing may start anew, with one or more sets of new blanked signals, chip positions or waveforms.

As provided previously, one embodiment of the present invention relates to a mitigation process using orthogonal decomposition of individual chips, signals, waveforms, etc. It is contemplated that this invention may be applicable to any set of orthogonal waveforms spanning the time-frequency signal space. In such embodiments, the received waveform is decomposed into the various components of the new basis set. Any distorted or noisy dimensions are estimated (similar to that provided previously using a "dimension component" replacing the chips for example). These distorted/noisy dimensions are blanked, and the time-domain waveforms regenerated but without such distorted/noisy dimensions. As an example, a combination of frequency domain interference and time domain burst noise could be mitigated with a concatenation of a frequency domain notched filter (e.g., a conventional filter) and the time domain sample blanking previously described in detail. The subsequent time-domain waveforms are correlated with each of the spreading codes, providing the blanked slicer inputs. The PRM takes the hard-decisions using such blanked slicer inputs, computing the PRME needed to be reintroduced due to the elimination of some of the signal space dimensions. The iterations continue just as above, except in this embodiment the transfer from chip samples to the desired basis set and back again must be included in the processing.

One embodiment of the present invention comprises one or more sets of symbols, signals, waveforms, etc., each set comprising one or more symbols, signals, waveforms, etc. having temporary high-level impairments of a duration of one up to several chips. Means are provided for detecting such temporary high-level impairments in the symbols, and then mitigating such temporary large impairments to improve the reliability of the symbol decisions even in the presence of such impairments.

It is contemplated that the SCDMA spreading codes may no longer be orthogonal, owing to such temporary high-level impairment. One embodiment of the present invention relates to mitigating, if not eliminating, such lack of orthogonality. This embodiment further relates to determining final hard-decision estimates for the transmitted symbols, and using such estimates to reduce such ICI.

A plurality of means for detecting symbols with increased noise or distortion in single-carrier carrier modulations are described previously. Such modulation means for detecting and mitigating such temporary high-level impairments may include using SCDMA modulation to detect increased noise/distortion in the symbols when multiple symbols are transmitted simultaneously. Furthermore, such modulation means may include OFDM, DMT and DWMT techniques for example using different but contemporaneous dimensions in the time-frequency domain.

It is further contemplated that transmitting and receiving signals using such concurrent symbol-modulation, like the embodiments provided above, may be used to: (1) catalog the severity, duration, repetitiveness, and perhaps other features of such impairment bursts; and (2) attempt to mitigate the impact of the increased impairment level using the identification of this condition in modified receiver processing. Such mitigation includes enabling erasure decoding when Reed-Solomon FEC is transmitted, and adjusting the soft-decision metrics to account for the low quality of the symbol estimates during the recognized bursts of large impairment, when Viterbi decoding (or any other soft decoding algorithm) is employed.

In one embodiment of the present invention using concurrent symbol-modulation (similar to the embodiments discussed previously using single-carrier modulation), one or more matched filter(s) may be used to process the received waveform, such that a soft-decision value is determined for each modulated symbol in a set of symbols. This value is inputted to a slicer. The slicer determines the closest constellation symbols for each soft-decisioned input. This closest constellation point represents the initial hard-decision estimate for the respective transmitted symbols.

In the previous disclosed embodiments using single-carrier modulation, the difference between the slicer inputs (i.e., the soft-decision values) and the hard-decision estimate (i.e., the selected closest constellation point) is the error vector. The magnitude or power of such error vectors are processed to determine which symbols are suspected of having been impacted by increased impairment levels. However it is contemplated that the impairment levels may rise and return to normal again in almost any amount of time. In fact, the "typical" duration is in general unknown, and must be determined or learned to enhance the accuracy of the identification of the disturbed or distorted symbols. A form of Heisenberg's uncertainty principle develops, wherein a great deal of smoothing (a wide or long observation window in the time domain covering many symbols) is used to estimate burst disturbances by lessening the precision in determining where the increased disturbance began and ended. Non-linear processing techniques may be used as provided previously to address this issue, but the fundamental issue still exists nonetheless.

In one embodiment of the present invention using concurrent symbol-modulation, however, one or more sets comprising a plurality of symbols are transmitted simultaneously, so that generally more than one and up to 128 error vectors are obtained at one time. The present invention contemplates handling up to 128 error vectors in parallel, summing the error vector power over the full set of symbols of each spreading frame. Adjusting the thresholds, either manually or using some sort of automatically self-adjusting thresholds, to compare to the total error vector power yields a much more sensitive and accurate means for determining when a burst of elevated disturbances has occurred. It is analogous to knowing that a particular set of 128 symbols are impacted in the single-carrier case, and being able to make a robust determination of channel quality (similar to an SNR estimate for example) using a window focused on more than one and up to 128 symbols known to share the same environment.

Thus, using SCDMA modulation, or any other modulation techniques using multiple symbols at the same time (multi-tone for example), a set of up to 128 symbols are obtained. Each symbol may be only slightly or greatly degraded, but all such symbols are impacted similarly by the intermittent channel impairments. This is in contrast to the TDMA techniques discussed previously, where only one or a few symbols may be impacted.

In one or more embodiments using concurrent symbol-modulation, where only one or a handful of chips (16 for example) are impacted by the impairment, the technique of examining the decision error power over the full set of 128 symbols, either using averaging or other estimation techniques (some of which are provided previously), may not yield a decisive result. However, the remodulation technique discussed previously will likely identify the set of chips where the distortion is isolated in such cases, and chip blanking or likelihood ratio technique may be used to mitigate such impairment.

Figure 14:
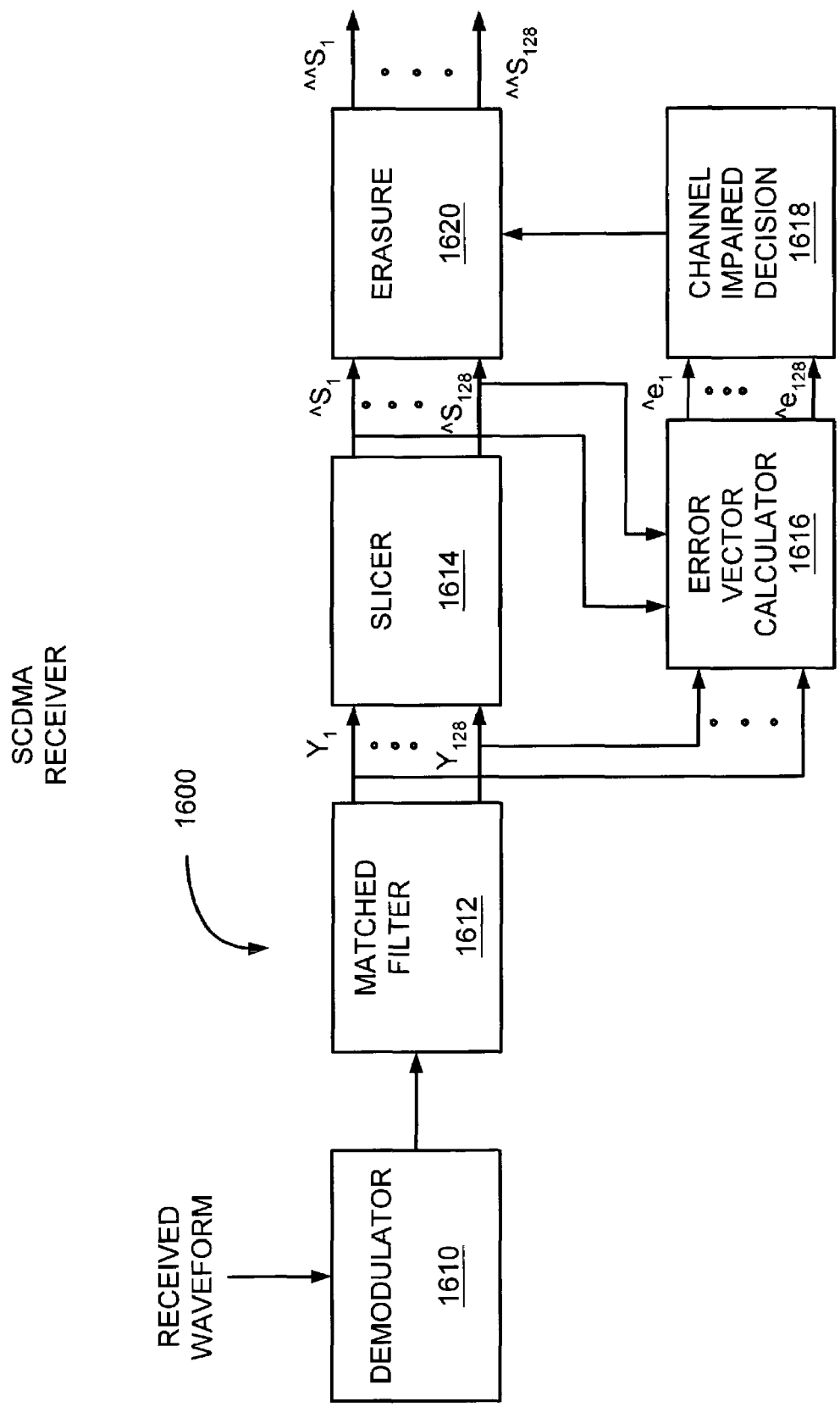
FIG. 14 Illustrates a block diagram of one embodiment of a SCDMA receiver in accordance with the present invention.

FIG. 14 illustrates a block diagram of one embodiment of an SCDMA receiver according to the present invention. It is contemplated that such SCDMA receiver may be used in any of the channels or systems discussed previously. The SCDMA receiver, generally designated 1600, is adapted to detect and mitigate temporary impairments or bursts in a channel using concurrent symbol-modulating techniques. It is contemplated that the illustrated SCDMA receiver 1600 may be used with at least one or sets comprising multiple symbols transmitted at the same time, examining one or more frames (i.e., adjacent frames). In one embodiment using 128 spreading codes, 128 symbols may be transferred to the receiver 1600 at the same time in the same set.

In this embodiment, the receiver 1600 comprises a demodulator 1610 adapted to receive and demodulate one or more sets comprising a plurality of waveforms, chips, symbols, signals, etc. The demodulator 1610 is communicatively coupled to one or more matched filters 1612 (for 128 spreading codes for example), adapted to output one or more Y matched filter outputs (alternatively referred to as "soft-decision values," $Y_1$ through $Y_{128}$ for example). In one embodiment of the present invention, the matched filters 1612 are adapted to isolate each demodulated transmitted symbol from all the other symbols in the set.

In single-carrier modulations as provided previously, a matched filter processes the received waveform, and a soft-decision value is determined for each modulated symbol. The soft-decisioned values are input to at least one or more slicers 1614. Using SCDMA modulation, it is contemplated that a bank of matched filters 1612, each uniquely processing the received waveforms in each set, produces a parallel set of soft-decisioned values at the end of each spreading interval. More specifically, it is contemplated that the filters 1612 output a vector of 128 matched filter outputs or soft-decisioned values. In this embodiment, it is contemplated that such unique processing comprises one matched filter and soft-decisioned value per input symbol. The slicer 1614 determines the closest constellation symbol for each received soft-decisioned value input ($Y_1$ through $Y_{128}$ for example). This closest constellation point represents the initial hard-decision estimate ($\hat{S}_1$ through $\hat{S}_{128}$ for example) for each transmitted symbol.

The matched filters 1612 and slicer 1614 are illustrated communicatively coupled to one or more error vector calculators 1616, which is adapted to receive such Y soft-decision values and $\hat{S}$ hard-decision estimates. In the illustrated embodiment, the calculator 1616 is adapted to receive a plurality of Y matched filter outputs or soft-decision values ($Y_1$ through $Y_{128}$ for example) and a plurality of hard-decision estimates ($\hat{S}_1$ through $\hat{S}_{128}$ for example).

In one embodiment, the calculator 1616 is adapted calculate or determine a difference between each hard-decisioned estimate and each associated soft-decision value, generating one or more estimate values $\hat{e}$. In one embodiment, the calculator 1616 yields a vector of one or more estimate vectors ($\hat{e}_1$ through $\hat{e}_{128}$ for example) for the full set of symbols of a set. The calculator 1616 produces a plurality of error vectors (128 for example) at one time. All the error vectors are similarly affected by such temporary impairment.

The error vectors are processed to determine what symbols are suspected of being disturbed. Channel impaired decision block 1618 is illustrated communicatively coupled to the error vector calculator 1616, and is adapted to receive the at least one estimate vector or value ($\hat{e}_1$ up to about $\hat{e}_{128}$ for example). The block 1618 is adapted to determine what symbols are suspect based on the magnitude of error vectors.

Block 1616 makes a decision on such error vectors or values using averaging or other estimation techniques.

Block 1616 is illustrated coupled to erasure block 1620, which also receives inputs from slicer 1614. In one embodiment, the erasure block 1620 is similar to a Reed-Solomon Decoder block as provided previously. In this embodiment, the block 1620, either erases or keeps the particular sample or symbol being considered. This process may be repeated so that the error power value or estimate corresponding to each sample or symbol is considered by block 1620. The block 1620 then decodes the samples or symbols with erasures. Many different types of algorithms may be used to decode such samples or symbols. Decoded data (a final hard-decision estimate of the transmitted signal), is outputted. In one embodiment, 128 hard-decisioned values ($\char`\^\char`\^S_1$ through $\char`\^\char`\^S_{128}$ for example) are outputted. In another embodiment, it is contemplated that a likelihood ratio may be determined for each symbol in the set.

Figure 15:
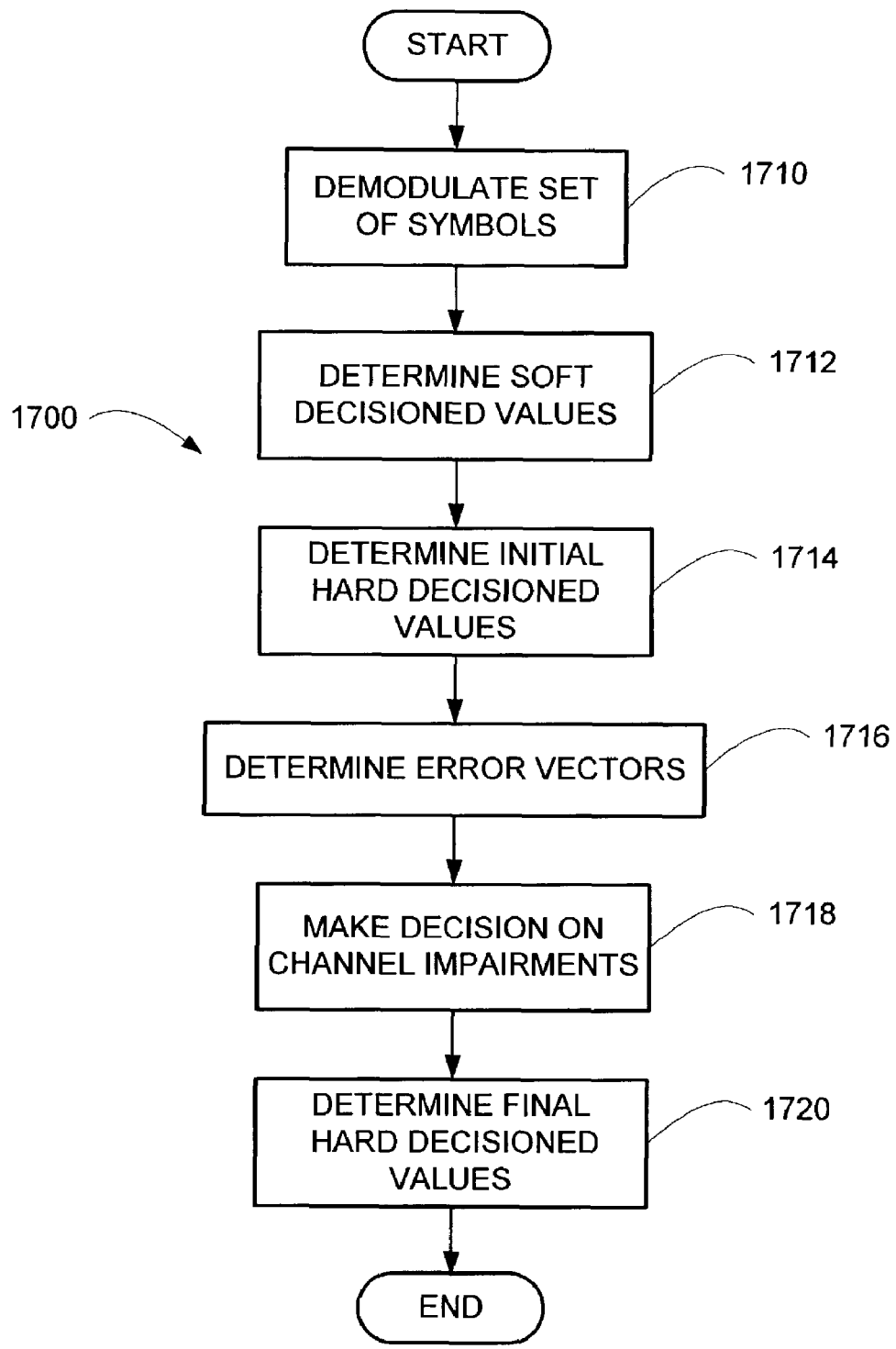
FIG. 15 illustrates a flow diagram illustrating one embodiment of a method for detecting temporary (i.e., bursts) high levels of distortion and mitigating such distortion using a receiver similar to that illustrated in FIG. 14 in accordance with the present invention.

FIG. 15 illustrates a flow diagram illustrating one embodiment of a method, generally designated 1700, for detecting and mitigating temporary impairments of one up to several chips in a set using a receiver (a SCDMA receiver for example) similar to that provided previously. This method comprises detecting such temporarily higher amounts of impairment in the symbols and improving the reliability of the symbol decisions even in the presence of such impacted or distorted chips. The method comprises demodulating the at least one modulated transmitted symbols or signals in each set of symbols or signals using one or more spreading codes as illustrated by block 1710. In one embodiment, up to 128 symbols are demodulated.

The method further comprises determining soft-decisioned values for the demodulated symbols as illustrated by block 1712. In one embodiment, one or more matched filters are used to produce one or more Y soft-decision values or matched filter outputs ($Y_1$ through $Y_{128}$ for example).

In one embodiment of the present invention, SCDMA modulations (similar to the previously discussed single-carrier modulations) one or more matched filters may be used to process the received waveform, such that a soft-decision value is determined for each modulated symbol. This value is inputted to a slicer. The slicer determines the closest constellation symbol for each soft input. This closest constellation point represents the initial hard-decision estimate for the respective transmitted symbol as illustrated by block 1714.

One or more error vectors are determined as illustrated by block 1716. In the previous disclosed embodiment using single-carrier modulations, the difference between the slicer inputs (i.e., the soft-decision values) and the hard-decision estimates (i.e., the selected closest constellation point) is the error vector. The magnitude or power of such error vectors are processed to determine which symbols are suspected of having been impacted by increased impairment levels.

In one embodiment of the present invention using SCDMA modulation, a plurality of symbols are transmitted simultaneously, so that generally more than one and up to 128 error vectors are obtained at one time as illustrated. The present invention contemplates handling up to 128 error vectors in parallel, summing the error vector power over the full set of symbols of each set. Adjusting the thresholds, either manually or using some sort of automatically self-adjusting thresholds, to compare to the total error vector power yields a much more sensitive and accurate means for determining when a burst of elevated disturbances has occurred. It is analogous to knowing that a particular set of 128 symbols are impacted in the single-carrier case, and thus being able to make a very robust determination of channel quality (similar to an SNR estimate for example) using a window focused on more than one and up to 128 symbols known to share the same environment.

It is further contemplated that, in the single-carrier case, the environment may change from symbol-to-symbol, and thus a large window (such as 128 symbols for example) may not provide the accuracy needed to determine which symbols are impacted. In SCDMA modulation however, all the symbols in a set are impacted similarly. It is contemplated that the spectral variations of the codes may show 10 dB of variation from symbol-to-symbol in the same set t in the presence of narrowband interference. However, such special cases of narrowband interference are handled differently from the rapidly time varying impairments targeted in the embodiment of the present invention. The latter impact many of the spreading codes at a time. The narrow band interference may be rejected via notched filters applied after time-domain blanking or the notched filtering may be performed prior to sample or chip blanking, or even a combination of blanking before and after filtering. With a combination of narrow band interference and time-domain burst noise, one embodiment would blank impacted samples (e.g., burst noise) prior to notched filtering and adapt the coefficient of the notched filter in subsequent computations of the filter output, in accordance with which input samples were blanked. The notched filter coefficient will in general vary with different combinations of blanked input samples. With different blanking patterns, different coefficients are required to try to attenuate the narrow band interference.

Thus, using SCDMA modulation, or any modulation techniques using multiple symbols at the same time in the same set (multitone for example), a set of up to 128 symbols are obtained, where all such symbols are impacted by an intermittent channel impairment. This is in contrast to the TDMA techniques discussed previously, where only one or a few symbols may be impacted. Thus it is contemplated that it may be easier to determine when the intermittent impairment has significantly impacted the set of up to 128 symbols with accuracy. The statistics for determining the error power arising from the slicer hard-decision values versus the soft-decision values has, in this embodiment, the advantage of viewing many "snapshots" or samples of error power (128 samples for example). The ability of one embodiment of the present invention using SCDMA modulation to more accurately detect the symbols impacted by an intermittent impairment enables using erasure decoding with greater benefit than that afforded in the TDMA case with relatively short bursts of the impairment, since a decision on the presence of the impairment must be made with little data, relatively speaking, in the TDMA case.

A decision is made on the channel impairments as illustrated by block 1718. In one or more embodiments using SCDMA modulation, where only one or a handful of chips (16 for example) are impacted by the impairment, the technique of examining the decision error powers over the full set of 128 symbols, either using averaging or other estimation techniques (some of which are provided previously), may not yield a decisive result. However, the remodulation technique discussed previously will likely identify the small set of chips where the distortion is isolated in these cases, and chip blanking rather than symbol erasing may be used to mitigate such distortion.

The hard-decision values are determined as illustrated by block 1720. In this embodiment, a hard-decision is made to keep or erase a particular set of samples or symbols being considered. This process may be repeated so that the error power estimate corresponding to each sample or symbol is considered. Finally, the sets of samples or symbols with erasures are decoded.

Figure 16:
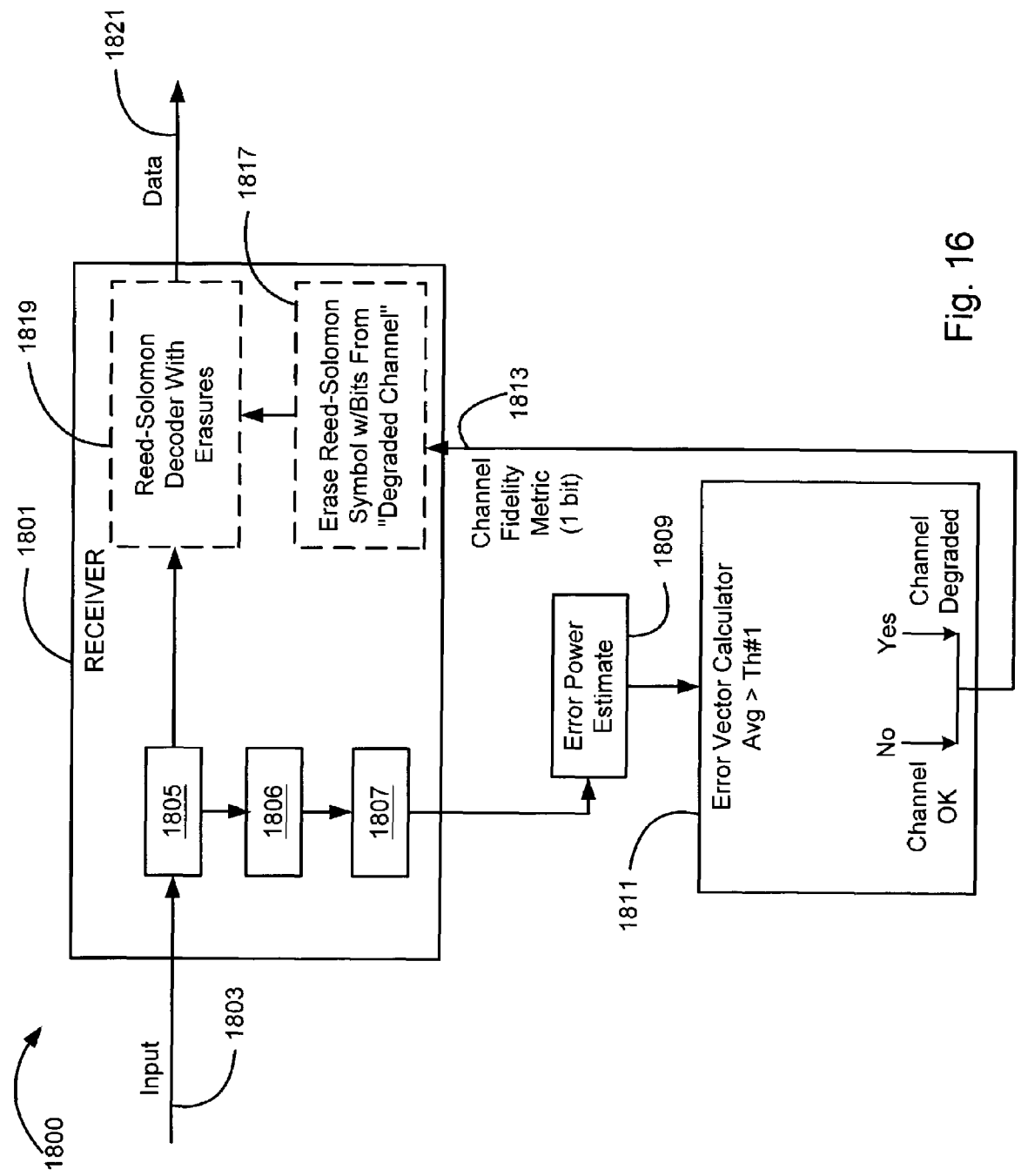
FIG. 16 illustrates a block diagram of an embodiment of an impairment mitigation system in accordance with the present invention.

FIG. 16 illustrates a block diagram of an impairment mitigation system 1800 in accordance with a particular embodiment of the present invention. The system 1800 (similar to system 600 of FIG. 6) may be contained, for example, in one or both of the communication nodes discussed previously. Referring to FIG. 15, receiver 1801 receives at input 1803 an input signal, in addition to an occasional or temporary high-level impairments, for example. In one embodiment, input 1803 comprises one or more sets, each set comprising one or more symbols. The receiver, using matched filter 1805, slicer 1806 and calculator 1807, generates error power estimates. The receiver 1801 generates such error power using a set of symbols in a digital communications example (or on a bit by bit basis or using a sequence of bits, or sample-by-sample in an analog waveform). A sliding window 1809, receives the error power estimates (128 for example), which are then processed in a channel impaired decision block 1811. The block 1811 continuously generates a metric for channel fidelity as the window (i.e., time) progresses.

Specifically, 1811 receives the 128 concurrent error power estimates at a time, and computes an average error power using the 128 captured estimates. The decision block 1811 may average the error vectors' powers or discard the extreme vectors (for example, discarding the ten largest and ten smallest vectors) and average the remaining error vectors' powers. In the illustrated embodiment, the block 1811 computes the average. Next, a determination is made whether the calculated average error power is greater than a predetermined threshold (i.e., too large). If it is not above its respective threshold, a "channel OK" indication is sent to the receiver 1801. If it is above or greater than its respective threshold, then a "channel degraded" indication is sent to the receiver 1801. This indication may be a simple 1 bit channel fidelity metric (e.g., a "1" for channel OK and a "0" for channel degraded for example). In a digital communications example, the fidelity processor 1811 generates a 1-bit channel fidelity metric over time for QAM constellations, for example.

In the above example, one set of 128 concurrent symbols is evaluated; in alternate embodiments, consecutive sets of concurrent symbols may be examined or processed to identify a degraded channel condition. This is the "sliding window" approach with the window covering more than one concurrent set of symbols.

The receiver 1801 receives the channel fidelity metric as illustrated by reference numeral 1813. Processing block 1817, knowing the channel fidelity metric and the particular set of samples or symbols being considered from the known delay, either erases (weights with low likelihood) the particular set of samples or symbols being considered (corresponding to a "channel degraded" fidelity metric), or keeps the particular sample or symbol being considered (corresponding to a "channel OK" fidelity metric). This process is repeated so that the error power estimate corresponding to each set of samples or symbols is considered by the block 1811.

A decoder 1819, such as, for example, a Reed-Solomon Decoder, decodes the set of samples or symbols with erasures, as determined by the block 1811. Many different types of algorithms may be used in the fidelity processor to generate fidelity metrics. Decoded data, an estimate of the transmitted signal for example, is outputted at output 1821 of the receiver 1801. It is contemplated that the functionality of processing block 1817 may be part of the decoder 1819. It is also contemplated that means other than as shown in, or specifically discussed with respect to FIG. 16 may be used to generate the fidelity metric.

In addition, while FIG. 16 illustrates a system having some components and functionality located outside of the receiver 1801, it should be understood that such system may have additional components or functionality located within the receiver 1801, or may in fact be entirely contained within the receiver 1801. In addition, it should also be understood that the estimation of the error power and the processing depicted as being performed within the receiver 1801 of FIG. 16, might instead be performed outside of the receiver.

Many modifications and variations of the present invention are possible in light of the above teachings. Thus, it is to be understood that, within the scope of the appended claims, the invention may be practiced otherwise than as described hereinabove.

The invention claimed is:

1. A communication system for transmitting a plurality of modulated symbols, comprising:
    a transmitter adapted to concurrently transmit a plurality of modulated symbols on a transmission channel, the plurality of modulated symbols together comprising a set of modulated symbols; and
    a receiver operable to receive said set of concurrently transmitted modulated symbols and mitigate temporary high-level impairment associated with said set of modulated symbols using a plurality of error estimates, each error estimate corresponding to one of the plurality of modulated symbols, the receiver being operable to erase said set of modulated symbols if a sum of error powers corresponding to each of the plurality of modulated symbols exceeds a predetermined threshold.

2. The system of claim 1, wherein said receiver may make hard decisions with respect to said set of modulated symbols and assign likelihood weightings thereto.

3. A communication system for transmitting a plurality of modulated symbols, comprising:
    a transmitter operable to concurrently transmit a plurality of modulated symbols on a transmission channel, the plurality of modulated symbols together comprising a set of modulated symbols; and
    a receiver operable to receive said set of concurrently transmitted modulated symbols and mitigate temporary high-level impairment associated with said set of modulated symbols using a plurality of error estimates, each error estimate corresponding to one of the plurality of modulated symbols, wherein said set of modulated symbols are weighted low likelihood if a sum of error powers corresponding to each of the plurality of modulated symbols exceeds a predetermined threshold.

4. A communication system for transmitting a plurality of SCDMA modulated symbols, comprising:
    a transmitter operable to concurrently transmit a plurality of modulated symbols on a transmission channel, the plurality of modulated symbols together comprising a set of SCDMA modulated symbols; and
    a receiver operable to receive said set of concurrently transmitted modulated symbols and mitigate temporary high-level impairment associated with said set of modulated symbols using a plurality of error estimates, each error estimate corresponding to one of the plurality of modulated symbols.

5. A communication system for transmitting a plurality of modulated symbols, comprising:
    a transmitter operable to concurrently transmit a plurality of modulated symbols on a transmission channel, the plurality of modulated symbols together comprising a set of modulated symbols; and a receiver operable to receive said set of concurrently transmitted modulated symbols and mitigate temporary high-level impairment associated with said set of modulated symbols using a plurality of error estimates, each error estimate corresponding to one of the plurality of modulated symbols, wherein said set of modulated symbols are erased based upon a function of error powers of all said modulated symbols.

6. A communication system for transmitting a plurality of modulated symbols, comprising:

a transmitter operable to concurrently transmit a plurality of modulated symbols on a transmission channel, the plurality of modulated symbols together comprising a set of modulated symbols; and a receiver operable to receive said set of concurrently transmitted modulated symbols and mitigate temporary high-level impairment associated with said set of modulated symbols using a plurality of error estimates, each error estimate corresponding to one of the plurality of modulated symbols, wherein said set of modulated symbols are weighted low likelihood based upon a function of error powers of all said symbols.

7. A communication system for transmitting a plurality of modulated symbols, comprising:

a transmitter operable to concurrently transmit a plurality of modulated symbols on a transmission channel, the plurality of modulated symbols together comprising a set of modulated symbols; and a receiver operable to receive said set of concurrently transmitted modulated symbols and mitigate temporary high-level impairment associated with said set of modulated symbols using a plurality of error estimates, each error estimate corresponding to one of the plurality of modulated symbols, wherein a plurality of error vectors are received and said receiver discards at least one error vector having an extreme value.

8. The system of claim 1, wherein said receiver further comprises a demodulator operable to demodulate the modulated symbols.

9. The system of claim 1, wherein said receiver comprises at least a plurality of matched filters operable to output a plurality of soft-decision values.

10. The system of claim 1, wherein said receiver further comprising a plurality of slicers operable to output a plurality of hard-decision estimates.

11. The system of claim 1, wherein said receiver further comprises a calculator operable to output a plurality of error estimates corresponding to the plurality of modulated symbols.

12. The system of claim 11, wherein said calculator uses at least one soft-decision value and at least one initial hard-decision estimate to determine said error estimates.

13. The system of claim 1, wherein said receiver further comprises a decision block operable to determine a hard-decision value.

14. The system of claim 1, wherein said receiver is operable to make preliminary hard decisions on all said symbols and perform at least one of the following including demodulating, filtering, blanking, making assessments of distortion characteristics, matched filtering to an ideal signaling waveform and remodulating, and making at least one distortion decision and performing any additional blanking and filtering as driven by said distortion decision.

15. A communication system for transmitting a plurality of modulated symbols, comprising:

a transmitter operable to concurrently transmit a plurality of modulated symbols on a transmission channel, the plurality of modulated symbols together comprising a set of modulated symbols; and a receiver operable to receive said set of concurrently transmitted modulated symbols and mitigate temporary high-level impairment associated with said set of modulated symbols using a plurality of error estimates, each error estimate corresponding to one of the plurality of modulated symbols, wherein said receiver is operable to make preliminary hard decisions on all said symbols and perform at least one of the following including demodulating, filtering, blanking, making assessments of distortion characteristics, matched filtering to an ideal signaling waveform and remodulating, and making at least one distortion decision and performing any additional blanking and filtering as driven by said distortion decision, wherein said receiver further makes at least one subsequent hard decision with respect to said set of modulated symbols and repairs any blanking damage and filtering using said at least one subsequent hard decision.

16. The system of claim 15, wherein said receiver may make hard decisions with respect to said set of modulated symbols and assign likelihood weightings thereto.

17. The system of claim 15, wherein said set of modulated symbols are erased if a sum of error powers corresponding to each of the plurality of modulated symbols exceeds a predetermined threshold.

18. The system of claim 15, wherein said set of modulated symbols are weighted low likelihood if a sum of error powers corresponding to each of the plurality of modulated symbols exceeds a predetermined threshold.

19. The system of claim 15, wherein the modulated signals are SCDMA modulated symbols.

20. The system of claim 15, wherein said set of modulated symbols are erased based upon a function of error powers of all said modulated symbols.

21. The system of claim 15, wherein said set of modulated symbols are weighted low likelihood based upon a function of error powers of all said symbols.

22. The system of claim 15, wherein a plurality of error vectors are received and said receiver discards at least one error vector having an extreme value.

23. The system of claim 15, wherein said receiver further comprises a demodulator operable to demodulate the modulated symbols.

24. The system of claim 15, wherein said receiver comprises at least a plurality of matched filters operable to output a plurality of soft-decision values.

25. The system of claim 15, wherein said receiver further comprising a plurality of slicers operable to output a plurality of hard-decision estimates.

26. The system of claim 15, wherein said receiver further comprises a calculator operable to output a plurality of error estimates corresponding to the plurality of modulated symbols.

27. The system of claim 26, wherein said calculator uses at least one soft-decision value and at least one initial hard-decision estimate to determine said error estimates.

28. The system of claim 15, wherein said receiver further comprises a decision block operable to determine a hard-decision value.

* * * * *